United States Patent
Roy et al.

(10) Patent No.: US 11,994,422 B2
(45) Date of Patent: May 28, 2024

(54) METHOD AND SYSTEM FOR REMOTELY MONITORING WASTEWATER IN MANHOLE OF UNDERGROUND DRAINAGE NETWORK AND ALERTING

(71) Applicant: Wipro Limited, Bangalore (IN)

(72) Inventors: Arindam Roy, Bangalore (IN); Vanganuri Harish Kumar Rama Sagar, Bangalore (IN)

(73) Assignee: Wipro Limited, Bangalore (IN)

(*) Notice: Subject to any disclaimer, the term of this patent is extended or adjusted under 35 U.S.C. 154(b) by 259 days.

(21) Appl. No.: 17/453,497

(22) Filed: Nov. 4, 2021

(65) Prior Publication Data
US 2022/0316933 A1 Oct. 6, 2022

(30) Foreign Application Priority Data
Mar. 30, 2021 (IN) ............................. 202141014508

(51) Int. Cl.
*G01F 23/00* (2022.01)
*G01F 23/284* (2006.01)
(Continued)

(52) U.S. Cl.
CPC ........ *G01F 23/0007* (2013.01); *G01F 23/284* (2013.01); *G01F 23/80* (2022.01);
(Continued)

(58) Field of Classification Search
CPC .... G01F 23/0007; G01F 23/284; G01F 23/80; G01F 23/2845; G01F 23/802;
(Continued)

(56) References Cited

U.S. PATENT DOCUMENTS 6,313,755 B1 11/2001 Hetmaniak et al.
2009/0250125 A1* 10/2009 Howitt .................. E03F 7/00
137/551

(Continued)

FOREIGN PATENT DOCUMENTS

| CN | 203849258 U | 9/2014 |
| CN | 207597434 U | 7/2018 |
| CN | 210835658 U | 6/2020 |

*Primary Examiner* — Benjamin R Schmitt
(74) *Attorney, Agent, or Firm* — Finnegan, Henderson, Farabow, Garrett & Dunner, LLP

(57) ABSTRACT

The present disclosure relates to wastewater management that provides a method and a system for monitoring a sewer manhole from a remote location. The sewer monitoring system configured in a sewer manhole receives measured values from a level sensor and determines an accuracy error in the measured values for different conditions. The sewer monitoring system resolves the accuracy error in the measured values to obtain accurate measured values by either measuring a level of wastewater in the sewer manhole by setting a first range limit for the measured values dynamically based on an actual depth of the sewer manhole, or iteratively measuring the level of wastewater in the sewer manhole by setting unique a second range limit for the measured values dynamically. A risk associated with the sewer manhole based on the accurate measured values of the level sensor is determined, for monitoring the sewer manhole from a remote location.

19 Claims, 8 Drawing Sheets

(51) Int. Cl.
  *G01F 23/80* (2022.01)
  *G08B 21/18* (2006.01)
  *E03F 7/00* (2006.01)
(52) U.S. Cl.
  CPC ......... *G01F 23/804* (2022.01); *G08B 21/182* (2013.01); *E03F 7/00* (2013.01); *E03F 2201/40* (2013.01)
(58) Field of Classification Search
  CPC ...... G01F 23/804; E03F 7/00; E03F 2201/40; E03F 2201/00; G08B 21/182
  See application file for complete search history.

(56) References Cited

U.S. PATENT DOCUMENTS

| | | | | |
|---|---|---|---|---|
| 2009/0303039 | A1* | 12/2009 | Drake | G01F 15/063 340/539.26 |
| 2012/0284278 | A1* | 11/2012 | Ikegami | H04L 43/0817 707/741 |
| 2019/0316951 | A1* | 10/2019 | McCormick | G01F 23/2845 |

* cited by examiner

|  | High Minimum | High Maximum | Medium Minimum | Medium Maximum | Low Minimum | Low Maximum |
|---|---|---|---|---|---|---|
| Level (cm) | H1: 0 | H2: 50 | M1: 51 | M2: 100 | L1: 101 | L3: 300 |

| | A | B | C | D | E | F | G | H |
|---|---|---|---|---|---|---|---|---|
| 1 | | | Current in Amps [A] | Duration (s) | No of Event per day | Total Duration [T] | Energy (J) | Formula |
| 2 | Radar Current | T1 | 0.37 | 1.05 | 24 | 25.2 | 33.57 | =F2*C2*B7 |
| 3 | GSM initialization | T2 | 0.047 | 17 | 2 | 34 | 5.75 | |
| 4 | GSM communication mode | T3 | 0.23 | 18 | 2 | 36 | 29.81 | =(G4+G3)*B5 |
| 5 | Loss on Data transmission | | 30% | | | | 10.67 | |
| 6 | Sleep mode | T4 | 0.0001 | 86363.95 | 1 | 86363.95 | 31.09 | |
| 7 | Voltage @ battery output [V] | 3.6 | | | | | | |
| 8 | Total energy drawn from battery for ONE Day | | | | | | 110.89 | =SUM(G2:G6) |
| 9 | Total energy drawn from battery for ONE YEAR | | | | | | 40473.96 | =G8*365 |
| 10 | First day POWER ON: initial burst current | | 2 | 6.00E-04 | 1 | 0.0006 | 0.00 | =B10*C10*B7 |
| 11 | Self-discharge per year | | 2% | | | | 8864.64 | =B11*G9 |
| 12 | TOTAL energy lost in 1 year | | | | | | 49338.20 | =G9+G10+G11 |
| 13 | TOTAL energy lost in 10 year | | | | | | 493382.03 | =G12*10 |
| 14 | Allowed Depth Of Discharge (DOD%) | | 95% | | | | | |
| 15 | Required Total Battery Power | | | | | 519349.50 | | =G13/B14 |
| 16 | SUMMARY | | | | | | | |
| 17 | BATTERY VOLTAGE | | | | 3.60 | V | | |
| 18 | BATTERY Ah RATING | | | | 38.00 | Ah | | |
| 19 | Battery Ah which can be used | | | | 34.20 | Ah | | |
| 20 | Energy available in the battery: | | | | 443232.00 | J | | =B17*B18*3600 |
| 21 | Energy Lost PER DAY | | | | 135.17 | J | | =G12/365 |
| 22 | Number of days the battery can provide energy | | | | 3278.99 | DAYS | | =E20/E21 |
| 23 | Number of years the battery can provide energy | | | | 8.984 | YEARS | | =E22/365 |

FIG.3F

METHOD AND SYSTEM FOR REMOTELY MONITORING WASTEWATER IN MANHOLE OF UNDERGROUND DRAINAGE NETWORK AND ALERTING

TECHNICAL FIELD

The present disclosure generally relates to wastewater management. More particularly, the present disclosure relates to a method and a system for remotely monitoring a sewer manhole.

BACKGROUND

Generally, one of an important aspect in urban infrastructure is remotely monitoring an underground drainage network. Whenever, there is a blockage in the underground drainage network it may be difficult to find out exact location of the blockage within the underground drainage network. In addition, early alerts of likelihood of blockage may not be received by respective staff on time to take preventive measures. Hence, detecting the exact location of the blockage may be time consuming if early alerts of the blockage are not received. It is a known fact that majority of underground drainage network management is performed manually and therefore it is not very efficient in maintaining clean and properly working underground drainage network.

In general, the sewer manholes may be closed using metal/concrete lid 102 and may include metal steps 104, as shown in FIG. 1A, which may be used by the staff to enter chamber of the sewer manhole for inspection and maintenance of pipes. In a scenario, when the sewage water levels are to be measured using a level sensor, the level of the metal steps 104 in the chamber may be detected as level of wastewater, which is an erroneous wastewater level, and it does not provide accurate wastewater level. Currently, to correct the measurement errors the staff may have to physically visit the location of the sewer manhole, for inspecting the water level.

In addition, the pipes or wastewater flow lines may be constructed in a specific way where the base surface of the chamber in the sewer manhole may not be flat but include channels 106, as shown in FIG. 1B. This may be a wastewater benching technique, in which the bench surface 108 as shown in FIG. 1B is sloped so that the surcharge flow of the wastewater runs off in the channels. Even in this scenario, a generic level sensor may not accurately measure sewage water level, due to presence of channels. Further, if an ultrasound-based sensor is used, the sound beam of the ultrasound-based sensor may not hit on a flat surface to receive accurate sewage water level, since most of the surface of the chamber is not uniform.

In addition, the sewer manhole lid 102 may be made of cast iron, ductile cast iron, steel, and/or plastic. If a monitoring device with a wireless sensor is placed under the lid, then most likely the signal from the antenna of the monitoring device may be blocked, due to non-penetration of Radio Frequency (RF) signals through the lid 102. Therefore, there may be an unsuccessful data transmission from the monitoring device end, and an unsuccessful data reception at a server end. Thus, relying on such remote monitoring system for monitoring wastewater in the underground drainage network leads to inefficiency, and could be troublesome and non-favourable.

The information disclosed in this background of the disclosure section is only for enhancement of understanding of the general background of the disclosure and should not be taken as an acknowledgement or any form of suggestion that this information forms prior art already known to a person skilled in the art.

SUMMARY

Disclosed herein is a method of monitoring a sewer manhole from a remote location. The method includes receiving, by a sewer monitoring system configured in a sewer manhole, measured values from a level sensor communicatively connected to the sewer monitoring system. Further, the method includes determining an accuracy error in the measured values received from the level sensor, for one or more conditions. Thereafter, the method includes resolving the accuracy error in the measured values received from the level sensor to obtain accurate measured values by performing one of measuring a level of wastewater in the sewer manhole by setting a first range limit for the measured values of the level sensor dynamically based on an actual depth of the sewer manhole, each time the level sensor is enabled for measuring the level of wastewater in the sewer manhole, or iteratively measuring the level of the wastewater in the sewer manhole by setting a unique second range limit for the measured values of the level sensor dynamically, using the actual depth of the sewer manhole as maximum value of the unique second range limit and a measured value of the level sensor of a previous iteration as a current minimum value of the unique second range limit, for each iteration, until the measured value of the level sensor of a current iteration fails to exceed the current minimum value. Finally, the method includes determining a risk associated with the sewer manhole based on the accurate measured values of the level sensor, for monitoring the sewer manhole from a remote location.

Further, the present disclosure includes a sewage monitoring system for monitoring a sewer manhole from a remote location. The sewage monitoring system includes a processor and a memory communicatively coupled to the processor. The memory stores the processor-executable instructions, which, on execution, causes the processor to receive measured values from a level sensor communicatively connected to the sewer monitoring system. Further, the processor determines an accuracy error in the measured values received from the level sensor, for one or more conditions. Thereafter, the processor resolves the accuracy error in the measured values received from the level sensor to obtain accurate measured values by performing one of measuring a level of wastewater in the sewer manhole by setting a first range limit for the measured values of the level sensor dynamically based on an actual depth of the sewer manhole, each time the level sensor is enabled for measuring the level of wastewater in the sewer manhole, or iteratively measuring the level of the wastewater in the sewer manhole by setting a unique second range limit for the measured values of the level sensor dynamically, using the actual depth of the sewer manhole as maximum value of the unique second range limit and a measured value of the level sensor of a previous iteration as a current minimum value of the unique second range limit, for each iteration, until the measured value of the level sensor of a current iteration fails to exceed the current minimum value. Finally, the processor determines a risk associated with the sewer manhole based on the accurate measured values of the level sensor, for monitoring the sewer manhole from a remote location.

Further, the present disclosure includes a non-transitory computer readable medium including instructions stored thereon that when processed by at least one processor causes sewer monitoring system to perform operations including receiving measured values from a level sensor communicatively connected to the sewer monitoring system. Thereafter, the instructions cause the processor to determine an accuracy error in the measured values received from the level sensor, for one or more conditions. Subsequently, the instructions cause the processor to resolve the accuracy error in the measured values received from the level sensor to obtain accurate measured values by performing one of measuring a level of wastewater in the sewer manhole by setting a first range limit for the measured values of the level sensor dynamically based on an actual depth of the sewer manhole, each time the level sensor is enabled for measuring the level of wastewater in the sewer manhole, or iteratively measure the level of the wastewater in the sewer manhole by setting a unique second range limit for the measured values of the level sensor dynamically, using the actual depth of the sewer manhole as maximum value of the unique second range limit and a measured value of the level sensor of a previous iteration as a current minimum value of the unique second range limit, for each iteration, until the measured value of the level sensor of a current iteration fails to exceed the current minimum value. Finally, the instructions cause the processor to determine a risk associated with the sewer manhole based on the accurate measured values of the level sensor, for monitoring the sewer manhole from a remote location.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 3F illustrates an exemplary table for determining estimated battery life, in accordance with some embodiments of the present disclosure.

Figure 1A:
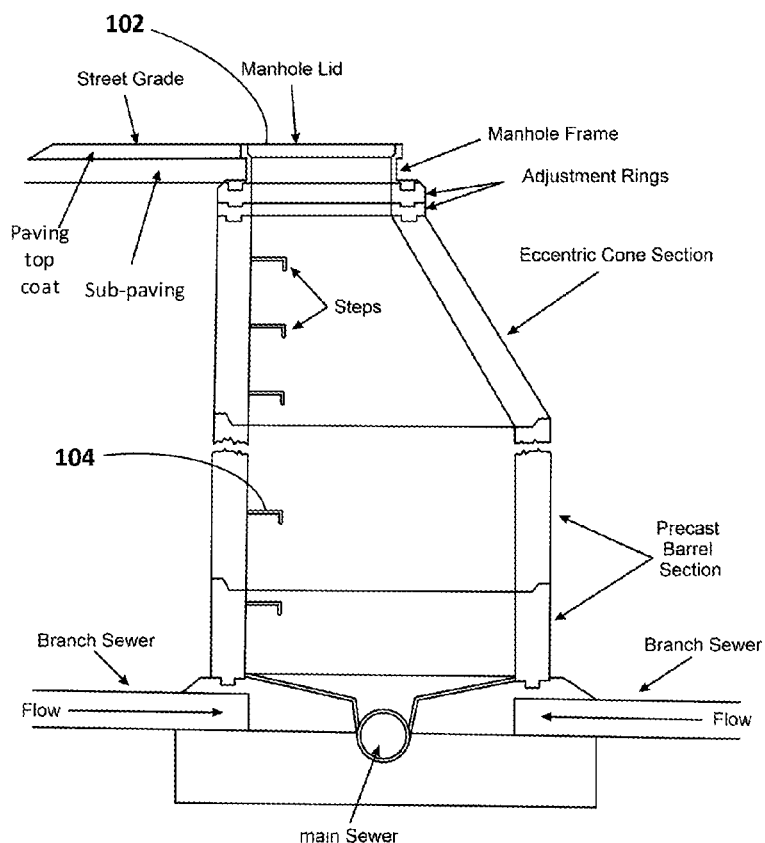
FIGS. 1A and 1B illustrate schematic diagrams of a sewer manhole and components in a chamber of the manhole.
Figure 1B:
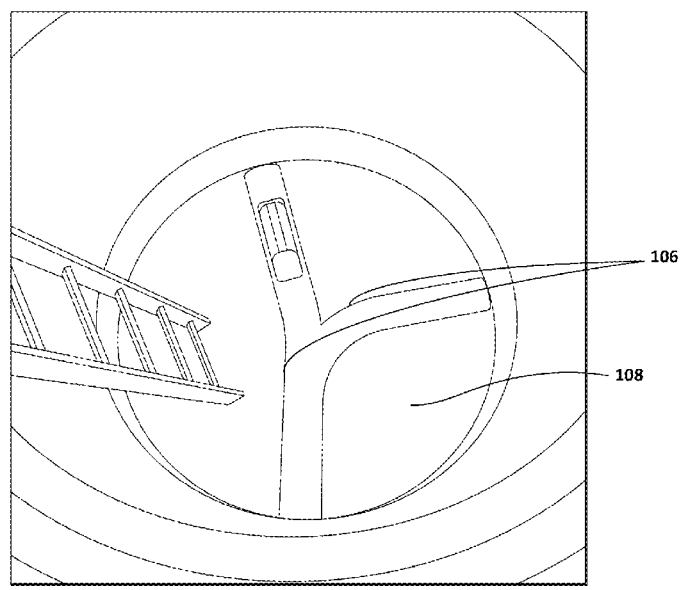

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure provides a method and a sewer monitoring system for monitoring a sewer manhole from a remote location. In some embodiments, the sewer monitoring system may be configured in a sewer manhole. In some embodiments, the sewage monitoring system may receive measured values from a level sensor communicatively connected to the sewer monitoring system. The measured values received from the level sensor may not be accurate due to various conditions such as occurrence of obstacles between the level sensor and the level of wastewater during level measurement, detecting level of the wastewater when the sewer manhole is empty, based on benching instead of channel in the sewer manhole, measured values of the level sensor exceeding actual depth of the sewer manhole and the like. The sewer monitoring system of the present disclosure may resolve accuracy error in the measured values received from the level sensor to obtain accurate measured values. In the context of the present disclosure, the accuracy error may defined as the deviation of the value measured by the one or more sensors from an actual ground truth value. In some embodiments, the sewer monitoring system may resolve the accuracy error based on techniques that involve dynamically setting minimum and maximum range limit for the level sensor when a measurement of the level of the wastewater in the sewer manhole is triggered. Upon resolving the accuracy error, the sewer monitoring system may determine a risk associated with the sewer manhole based on the accurate measured values of the level sensor, for monitoring the sewer manhole from a remote location. In some embodiments, the sewer monitoring system may be associated with a remote server. In some embodiments, when the sewer monitoring system is associated with the remote server, the sewer monitoring system may transmit the accurate measured values of the level sensor and recorded values of one or more additional sensors associated with the sewer monitoring system, to the remote server. The remote server may then determine risk associated with the sewer manhole based on the accurate measured values of the level sensor and recorded values of one or more additional sensors, for monitoring the sewer manhole from the remote location. In some embodiments, the remote server may also generate alerts based on the risk determined, for taking necessary action to mitigate damages caused by incidents that have occurred and damages that may be caused due to potential incidents that may occur.

In some embodiments, present disclosure provides accurate measurement of the wastewater level and eliminates erroneous measured values due to obstacles such as metal steps and/or other objects present within the chamber of the sewer manhole. Further, the present disclosure may enable differentiating the wastewater level from benching in the chamber to provide accurate measurement of the wastewater level. Also, due to consideration of weather forecast and historical data, the present disclosure enables effective use of the sensors for measurement of the wastewater level. Effective use of the sensors involves sleep mode, when not in use, or when not required, which may be enabled to maximize the battery life. Further, the present disclosure ensures safety by accurate and early detection of flammable gases in the chamber of the sewer manhole and/or tamper detection of lid of the sewer manhole due to wear and tear and due to unauthorized access. Moreover, due to integration of lightweight protocol such as User Datagram Protocol (UDP) and Narrowband—Internet of Things (NB-IoT) communication standard, the present disclosure ensures maximum data reception, by remote server when the sewer monitoring system transmits the accurate measured values and recorded values to the remote server.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 2A:
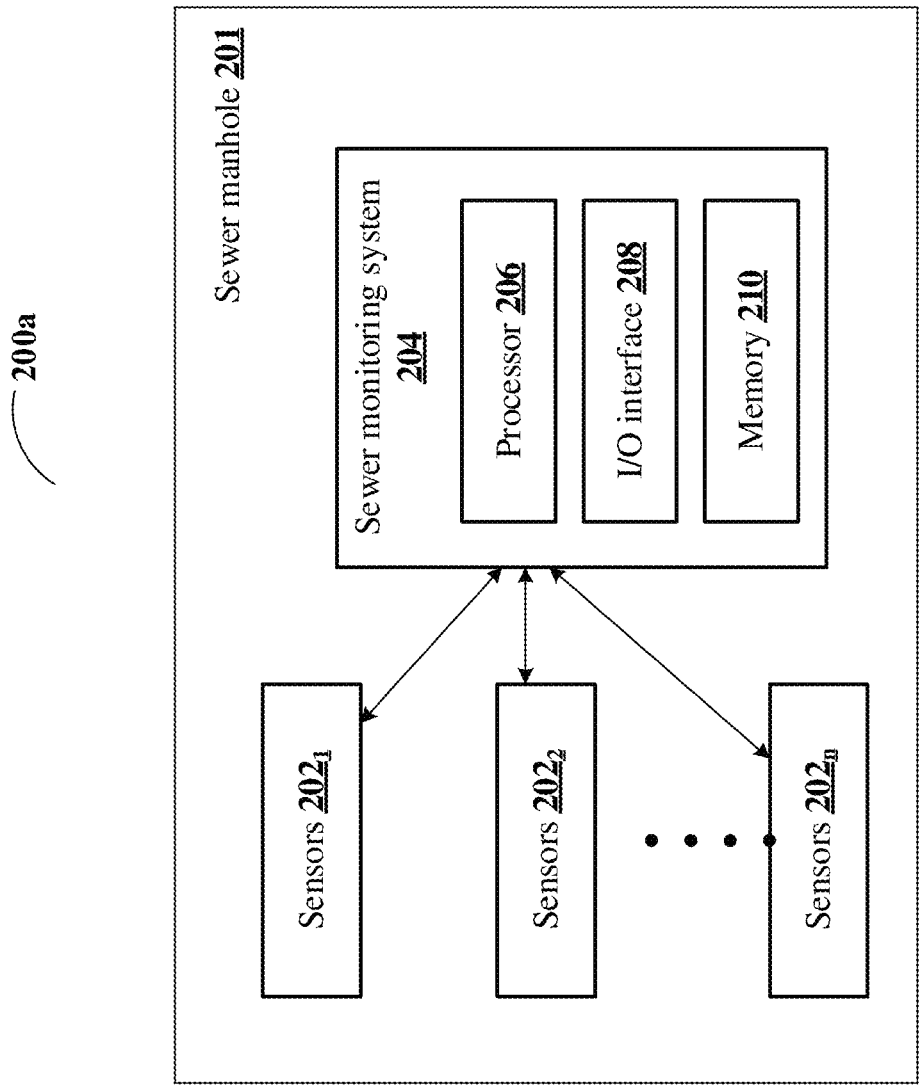
FIG. 2A illustrates an exemplary architecture illustrating a method and a system of monitoring a sewer manhole from a remote location, in accordance with some embodiments of the present disclosure.

FIG. 2A illustrates an exemplary architecture illustrating a method and a system of monitoring a sewer manhole from a remote location, in accordance with some embodiments of the present disclosure.

The architecture $200a$ may include sensors $202_1$ to sensors $202_n$ (hereinafter collectively referred as the one or more sensors 202), and a sewer monitoring system 204. In some embodiments, the exemplary architecture $200a$ is illustrated with one sewer monitoring system 204 configured in a sewer manhole 201, and associated with the one or more sensors 202. However, this should not be construed as a limitation of the claimed invention, as the same implementation is applicable for multiple sewer monitoring systems configured in multiple sewer manholes and associated with their respective one or more sensors. In some embodiments, the one or more sensors 202 may include, but not limited to a, a level sensor, a temperature sensor, a light detection sensor, a Global Position System (GPS), a battery level detection sensor, and a gas sensor. In the context of the claimed invention, except the level sensor, rest of the one or more sensors 202 are referred as one or more additional sensors. In some embodiments, the level sensor may measure level of the wastewater in the sewer manhole 201, the temperature sensor may measure temperature in and around the sewer manhole 201, the gas sensor may measure the presence and amount of certain types of gases in the sewer manhole 201, the light detection sensor may measure the amount of light entering the sewer manhole 201, the GPS may measure the coordinates of the sewer manhole 201, and the battery level detection sensor may detect battery level i.e. current battery status and remaining battery life of the one or more sensors 202.

In some embodiments, the one or more sensors 202 and the sewer monitoring system 204 may be configured in, for example, public and/or private sewer manholes 201. In some embodiments, the one or more sensors 202 along with the sewer monitoring system 204 may be placed at various locations of the sewer manhole 201 such as, below a lid of the sewer manhole 201, within a chamber of the sewer manhole 201, on metal steps of the sewer manhole 201, and the like. In some other embodiments, the sewer monitoring system 204 may be placed at center of the sewer manhole 201. In some embodiments, the sewer monitoring system 204, communicatively connected with the one or more sensors 202, may be placed in close proximity of the sewer manhole 201. In some embodiments, the one or more sensors 202 may be powered using a lithium thionyl chloride-based battery (not shown in FIG. 2A) as an example, with total capacity of, for instance, 38 amp-hour and a nominal voltage of 3.6V. The battery may provide a total lifespan of up to, for instance 7-10 years. Due to the long lifespan of the battery, multiple visits to the sewer manhole 201 may be avoided to replace the battery.

In some embodiments, the one or more sensors 202 may be communicatively connected to the sewer monitoring system 204. via a communication network. As an example, the communication network may be a wired or a wireless communication network. In some embodiments, the sewer monitoring system 204 may be configured in the sewer manholes throughout city and at private campuses, to ensure that, the wastewater is monitored effectively at each manhole.

In some embodiments, the sewer monitoring system 204 may include a processor 206, an I/O interface 208 and a memory 210. The I/O interface 208 may receive measured values from the level sensor communicatively connected to the sewer monitoring system 204. The I/O interface 208 may further receive recorded values from one or more additional sensors communicatively connected to the sewer monitoring system 204. As an example, the one or more additional sensors may include at least one of the temperature sensor, the light detection sensor, the GPS, the battery level detection sensor, and the gas sensor. Upon receiving the measured values from the level sensor, the processor 206 may determine an accuracy error in the measured values received from the level sensor, for one or more conditions. In some embodiments, the one or more conditions may include, but not limited to, the measured values of the level sensor exceeding actual depth of the sewer manhole 201, the measured values of the level sensor correspond to detection of a benching in the sewer manhole 201 instead of detection of a channel, when the sewer manhole 201 is empty, and the measured values of the level sensor correspond to detection of one or more objects protruding from inner walls of the sewer manhole 201.

The processor 206 may thereafter resolve the accuracy error in the measured values received from the level sensor to obtain accurate measured values. In some embodiments, to resolve the accuracy error in the measured values, the processor 206 may measuring a level of wastewater in the sewer manhole 201 by setting a first range limit for the measured values of the level sensor dynamically based on an actual depth of the sewer manhole 201. Such first range limit may be set each time the level sensor is enabled for measuring the level of wastewater in the sewer manhole 201. In some embodiments, the first range limit may be stored in the storage associated with the sewer monitoring system 204. For instance, the storage may be the memory 210 of the sewer monitoring system 204 or the storage may be any other external storage device associated with the sewer monitoring system 204. In some other embodiments, the sewer monitoring system 204 may fetch the first range limit from a remote server, when the sewer monitoring system 204 is associated with the remote server (not shown in the FIG. 2A).

In some other embodiments, to resolve the accuracy error in the measured values, the processor 206 may iteratively measure the level of the wastewater in the sewer manhole 201 by setting a unique second range limit for the measured values of the level sensor dynamically. In some embodiments, such unique second range limit may be set using the actual depth of the sewer manhole 201 as maximum value of the unique second range limit and a measured value of the level sensor of a previous iteration as a current minimum value of the unique second range limit, for each iteration. In some embodiments, the unique second range limit may be set using the actual depth of the sewer manhole 201 as maximum value of the unique second range limit and a measured value of the level sensor of a previous iteration as a current minimum value of the unique second range limit, for each iteration, until the measured value of the level sensor of a current iteration fails to exceed the current minimum value.

Thereafter, the processor 206 may determine a risk associated with the sewer manhole 201 based on the accurate measured values of the level sensor, for monitoring the sewer manhole 201 from a remote location. In some embodiments, determining the risk associated with the sewer manhole 201 may include determining occurrence of an incident at the sewer manhole 201. In some other embodiments, determining the risk associated with the sewer manhole 201 may include predicting occurrence of a potential incident at the sewer manhole 201. Based on the determined risk, the processor 206 may generate incident alerts and potential incident alerts related to the sewer manhole 201 to enable utility personnel to take one or more actions to mitigate or prevent damage to the sewer manhole 201 due to the occurrence of the incident or the predicted occurrence of the potential incident at the sewer manhole 201. In some embodiments, the incidents and the potential incidents may include, but not limited to, blockages or flooding in the sewer manhole 201 due to increasing/decreasing in level of wastewater in the sewer manhole 201, unauthorized tampering of sewer manhole 201, presence of flammable gas in the sewer manhole 201, battery level and battery performance of the one or more additional sensors and the level sensor.

Figure 2B:
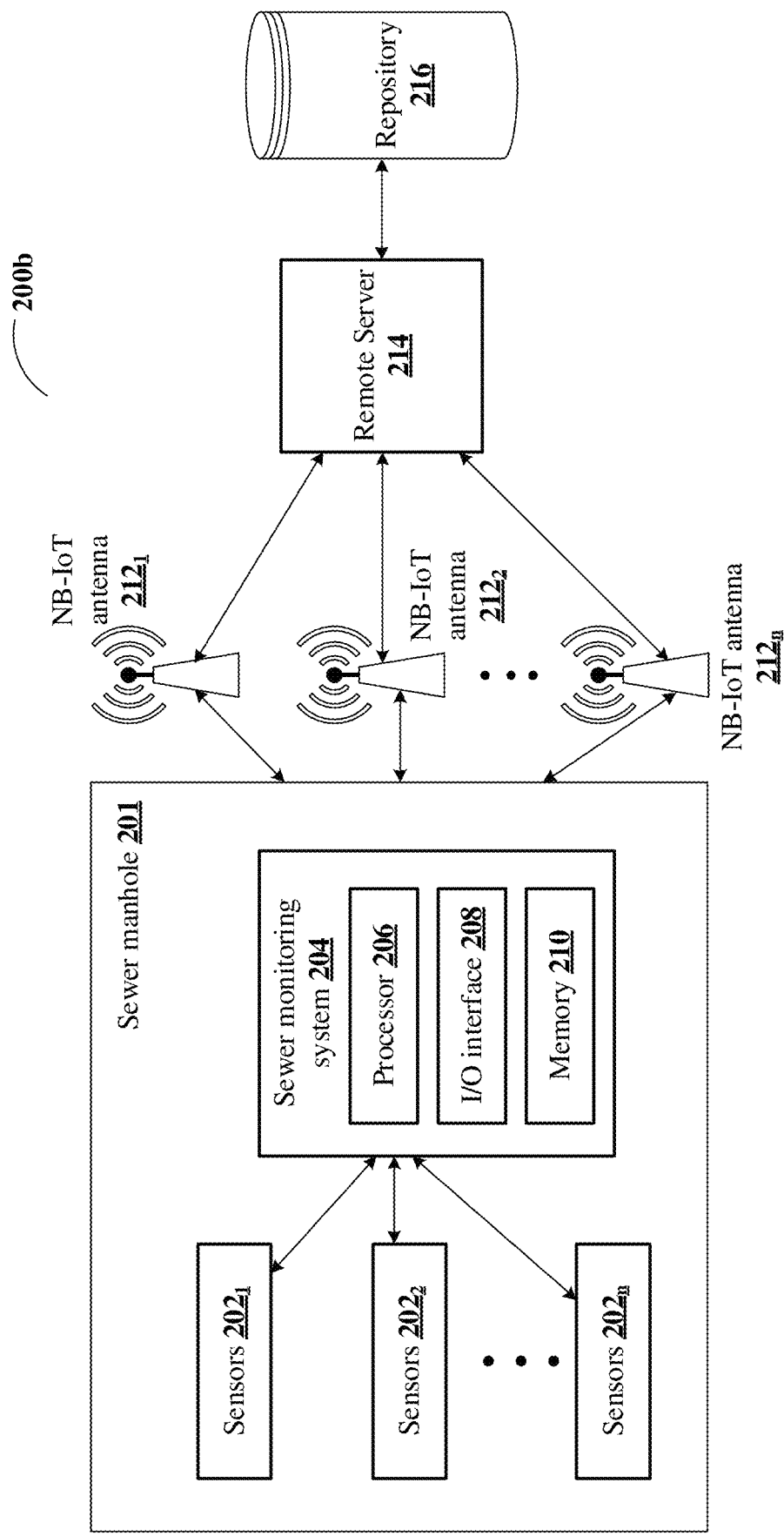
FIG. 2B illustrates an alternative exemplary architecture illustrating a method and a system of monitoring a sewer manhole from a remote location, in accordance with some embodiments of the present disclosure.

FIG. 2B illustrates an alternative exemplary architecture illustrating a method and a system of monitoring a sewer manhole 201 from a remote location, in accordance with some embodiments of the present disclosure.

This architecture 200b may include sensors $202_1$ to sensors $202_n$ (hereinafter collectively referred as the one or more sensors 202), a sewer monitoring system 204, a Narrow Band-Internet of Things antenna (NB-IoT) $212_1$ to a Narrow Band-Internet of Things antenna (NB-IoT) $212_n$ (hereinafter collectively referred as the NB-IoT antenna 212), a remote server 214 and a repository 216. In this architecture, the sewer monitoring system 204 may be communicatively connected to remote server 214 via the NB-IoT antenna 212, respectively as shown in the FIG. 2B. In some embodiments, the remote server 214 may be a host server, through which data collection, processing and analysis may be performed. In some embodiments, the remote server 214 may be a remote computer in a control room (or) a third-party cloud storage. In this architecture 200b, the connections, functionalities and other aspects described regarding the one or more sensors 202 as part of the architecture 200a hold good, and the same is referred herewith in totality. However, the functionality of the sewer monitoring system 204 described as part of the architecture 200a may be considered on up to the stage where the sewer monitoring system 204 resolves the accuracy error in the measured values.

According to this architecture 200b, upon resolving the accuracy error in the measured values, the sewer monitoring system 204 may transmit the accurate measured values of the level sensor to the remote server 214, for monitoring the sewer manhole 201 from a remote location. In some embodiments, the sewer monitoring system 204 may categorize each of the accurate measured values of the level sensor and measured values received from one or more additional sensors into a risk category, based on pre-set risk threshold for the corresponding sewer manhole 201. As an example, the risk categories may include, but not limited to, high risk, medium risk and low risk. Upon categorizing, the sewer monitoring system 204 may transmit the accurate measured values of the level sensor and the measured values received from the one or more additional sensors to the remote server 214 based on the risk category. In some embodiments, when the risk category is one of "high risk" and "medium risk", the processor 206 may transmit the accurate measured values of the level sensor and the measured values received from the one or more additional sensors immediately to the remote server 214. In some other embodiments, when the risk category is "low risk", the processor 206 may transmit the accurate measured values of the level sensor and the measured values received from the one or more additional sensors at predefined time intervals to the remote server 214. In some embodiments, the sewer monitoring system 204 may transmit the accurate measured values of the level sensor and the measured values received from the one or more additional sensors to the remote server 214 using a Narrowband-Internet of Things (NB-IoT) mode and a User Datagram Protocol (UDP), at predefined time intervals.

In some embodiments, the remote server 214 may receive the accurately measured values from the level sensor, and measured values from the one or more additional sensors as input data. Upon receiving the input data, the remote server 214 may perform one of determining occurrence of an incident at the sewer manhole 201 or predicting occurrence of a potential incident at the sewer manhole 201 based on analysis of the input data. In some embodiments, the analysis may be performed in correlation with risk categories of the input data, historical data related to the sewer manhole 201 and specific predefined rules and thresholds corresponding to incidents and potential incidents related to the sewer manhole 201. Based on the determination, the remote server 214 may generate incident alerts or potential incident alerts related to the sewer manhole 201 to enable utility personnel to take one or more actions to mitigate or prevent damage to the sewer manhole 201 due to the occurrence of the incident or the predicted occurrence of the potential incident at the sewer manhole 201. In some embodiments, the remote server 214 may be associated with the repository 216. In some embodiments, the repository 216 may include plurality of databases, which includes, for instance, reference data, historic data, forecast data, and previously measured data/values from the one or more sensors 202 associated with the sewer manhole 201. Further, the repository 216 may include data, but not limited to, Identity (ID) numbers of each of the one or more sensors 202 and each sewer monitoring system 204 communicatively connected with the one or more sensors 202, associated with respective sewer manhole 201s and their respective coordinates.

Figure 3A:
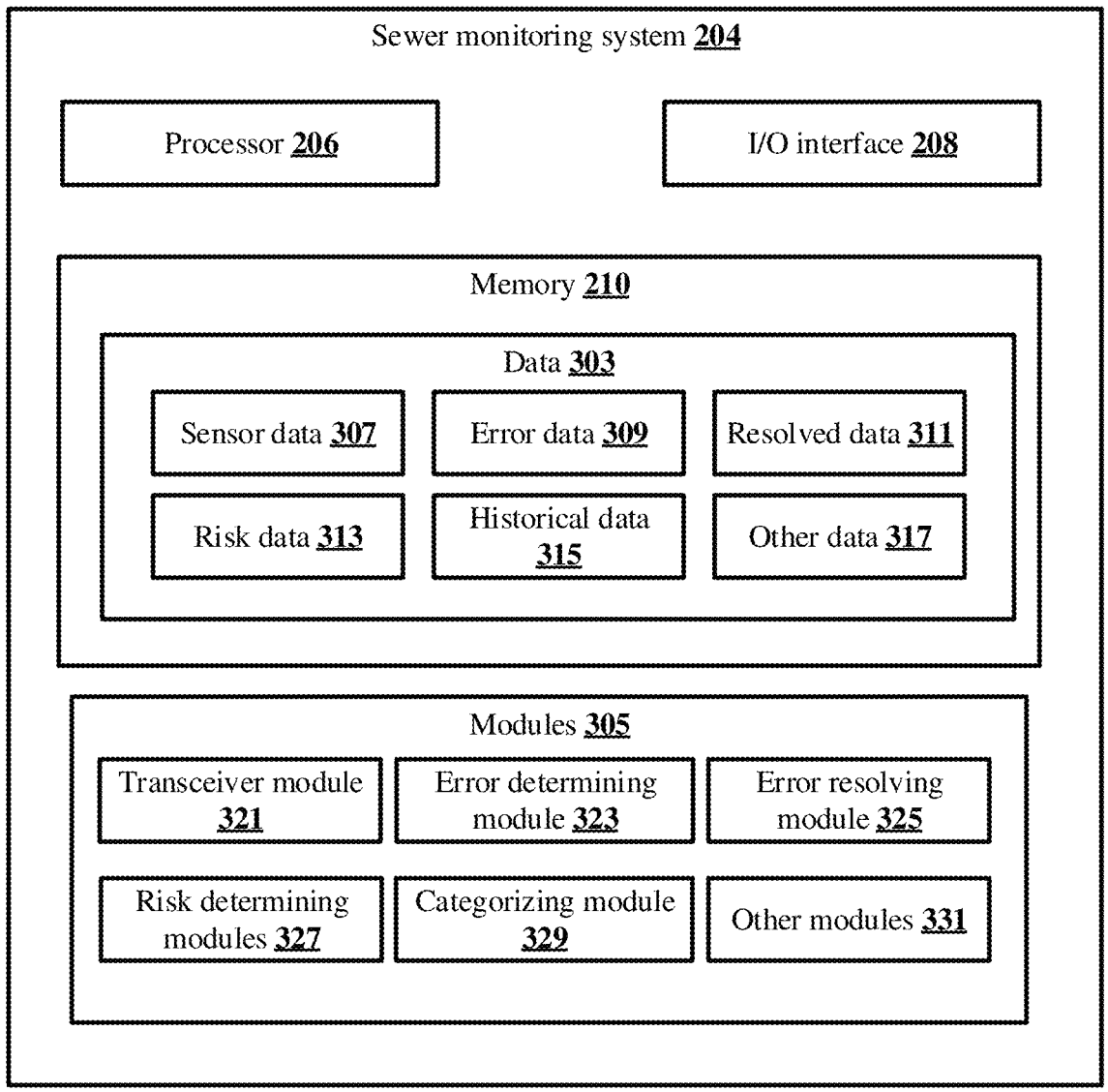
FIG. 3A shows a detailed block diagram of a sewer monitoring system for monitoring a sewer manhole from a remote location in accordance with some embodiments of the present disclosure.

FIG. 3A shows a detailed block diagram of a sewer monitoring system for monitoring a sewer manhole 201 from a remote location in accordance with some embodiments of the present disclosure.

In some implementations, the sewer monitoring system 204 may include data 303 and modules 305. As an example, the data 303 is stored in the memory 210 configured in the sewer monitoring system 204 as shown in the FIG. 3A. In one embodiment, the data 303 may include sensor data 307, error data 309, resolved data 311, risk data 313, historical data 315 and other data 317.

In some embodiments, the data 303 may be stored in the memory 210 in the form of various data structures. Additionally, the data 303 can be organized using data models, such as relational or hierarchical data models.

In some embodiments, the sensor data 307 may include data measured by one or more sensors 202 associated with the sewer monitoring system 204. In some embodiments, the one or more sensors 202 may include, but not limited to a, a level sensor, a temperature sensor, a light detection sensor, a Global Position System (GPS), a battery level detection sensor, and a gas sensor. In the context of the claimed invention, except the level sensor, rest of the one or more sensors 202 are referred as one or more additional sensors. In some embodiments, the level sensor may measure level of the wastewater in the sewer manhole 201, the temperature sensor may measure temperature in and around the sewer manhole 201, the gas sensor may measure the presence and amount of certain types of gases in the sewer manhole 201, the light detection sensor may measure the amount of light entering the sewer manhole 201, the GPS may measure the coordinates of the sewer manhole 201 and the battery level detection sensor may detect battery level i.e. current battery status and remaining battery life of the one or more sensors 202. In some embodiments, the level sensor may convert Radio Frequency (RF) front-end analogue data to a digital representation data through an analogue-to-digital converter. This digitally converted data may require high-speed external data buses to transmit a data stream for further processing of the data stream by the sewer monitoring system 204, which involves a series of mathematical operations to generate the distance of the wastewater (in other words, level of the wastewater) from the one or more sensors 202. In some embodiments, the level sensor may include transmit (TX) and a receive (RX) Radio Frequency (RF) components, analogue components such as clocking, digital components such as analogue-to-digital converters (ADCs) and a processor unit. Further, the temperature sensor may detect and transmit periodic temperature values of sewer manhole 201 area. Furthermore, the light detection sensor may sense the light within the chamber of the sewer manhole 201. When a lid of the sewer manhole 201 is closed, the amount of light entering the sewer manhole 201 may remain same until the lid is opened or tampered. Hence, the light detection sensor helps in detecting if the lid of the sewer manhole 201 has been opened or not. Such tamper detection can be used to detect any unauthorized access of the sewer manhole 201. The GPS may be configured to collect geographic location related data such as longitude and latitude of the sewer manhole 201. Further, the gas sensor may be used to detect flammable gas in the sewer manhole 201. For instance, the gas sensor may detect gases such as hydrocarbons, methane, and the like.

In some embodiments, the error data 309 may include accuracy errors determined for the measured values received from the level sensor. In some other embodiments, the error data 309 may also include accuracy errors determined in recorded values received from the one or more additional sensors as well. In the context of the present disclosure, the accuracy error may defined as the deviation of the value measured by the one or more sensors 202 from an actual ground truth value. As an example, when the measured values of the level sensor exceed an actual depth of the sewer manhole 201, then it may be referred as an accuracy error. Similarly, when the measured values of the level sensor correspond to detection of a benching in the sewer manhole 201 instead of detection of a channel, when the sewer manhole 201 is empty, it may be referred as an accuracy error. Similarly, when the measured values of the level sensor correspond to detection of one or more objects protruding from inner walls of the sewer manhole 201, instead of the detection of a channel, then it may be referred as an accuracy error.

In some embodiments, the resolved data 311 may include accurate measure values i.e., the values obtained as a result of resolving the accuracy error in the measured values received from the level sensor. In some other embodiments, the resolved data 311 may also include values obtained as a result of resolving accuracy error in the recorded values of the one or more additional sensors.

In some embodiments, the risk data 313 may include data associated with at least one of determined occurrence of an incident at the sewer manhole 201 and predicted occurrence of a potential incident at the sewer manhole 201. In some embodiments, the risk data 313 may also include data associated with the one or more alerts such as incident alerts or potential incident alerts related to the sewer manhole 201 generated based on the determined occurrence of an incident at the sewer manhole 201 and predicted occurrence of a potential incident at the sewer manhole 201, respectively. In some embodiments, the risk data 313 may include risk category associated with each of the accurate measured values of the level sensor and the recorded values of the one or more additional sensors. As an example, the risk category may include, but not limited to, high risk, medium risk and low risk. In some embodiments, the risk data 313 may also include color codes for indicating risk and urgency associated with the generated incident alerts and the potential incident alerts.

In some embodiments, the historical data 315 may include data such as measured values from the one or more sensors 202, the error data 309, the resolved data 311 and the risk data 313 associated with the previous iterations/cycles. The historical data 315 may help in performing prediction of the occurrence of the potential incidents and in determining the occurrence of the incidents at the sewer manhole 201.

In some embodiments, the other data 317 may store data, including temporary data and temporary files, generated by the modules 305 for performing the various functions of the sewer monitoring system 204. The other data 317 may also store various predefined thresholds and dynamically determined thresholds/range limits associated with resolving accuracy errors, determining occurrence of incidents at the sewer manhole 201 and predicting occurrence of the potential incidents at the sewer manhole 201. Further, the other data 317 may store weather forecast data dynamically received from sources that provide weather forecast data.

In some embodiments, the data 303 stored in the memory 210 may be processed by the modules 305 of the sewer monitoring system 204. The modules 305 may be stored within the memory 210. In an example, the modules 305 communicatively coupled to the processor 206 configured in the sewer monitoring system 204, may also be present outside the memory 210 as shown in FIG. 3A and implemented as hardware. As used herein, the term modules 305 may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In some embodiments, the modules 305 may include, for example, a transceiver module 321, an error determining module 323, an error resolving module 325, a risk determining module 327, a categorizing module 329 and other modules 331. The other modules 331 may be used to perform various miscellaneous functionalities of the sewer monitoring system 204. It will be appreciated that such aforementioned modules 305 may be represented as a single module or a combination of different modules.

In some embodiments, the transceiver module 321 may receive measured values from the level sensor communicatively connected to the sewer monitoring system 204. In some embodiments, the measured values received from the level sensor may correspond to level of the wastewater in the sewer manhole 201. In some other embodiments, the transceiver module 321 may also receive recorded values from the one or more additional sensors such as a temperature sensor, a light detection sensor, a Global Position System (GPS), a battery level detection sensor, and a gas sensor. The recorded values of the temperature sensor may correspond to temperature in and around the sewer manhole 201, recorded values of the gas sensor may correspond to the presence and amount of certain types of gases in the sewer manhole 201, recorded values of the light detection sensor may measure the amount of light entering the sewer manhole 201, recorded values of the GPS may measure the coordinates of the sewer manhole 201 and recorded values of the battery level detection sensor may detect battery level i.e. current battery status and remaining battery life of the one or more sensors 202.

In some embodiments, the processor 206 may trigger the one or more sensors 202 to measure the values, for instance, at every time interval 'T'. In some implementations, the processor 206 may trigger or request data from the one or more sensors 202 using a Universal Asynchronous Receiver-Transmitter (UART) protocol. The one or more sensors 202 may radiate a Radio Frequency (RF) signal (e.g., 77-81 Ghz) to obtain a range measurement of wastewater. The one or more sensors 202 may enter sleep mode after the time interval 'T' until a next time interval. The light detection sensor may detect any encountered activity and triggers interrupt-based routine to wake up the processor 206, via an interrupt signal. The processor 206 may trigger the level sensor and the temperature sensor to sense and transmit respective data for shorter intervals of time T.

In some implementations, the temperature sensor may rely on a predictive temperature dependence of a silicon band gap in the temperature sensor made of Integrated Circuit (IC) to measure the temperature values. Similarly, when gas sensor detects flammable gas, for instance, methane or hydrocarbon, the gas sensor may generate an interrupt-based routine via interrupt signal to wake up the processor 206. To detect flammable gas and generate fire alert, the gas sensor may check if a specified concentration of the gas is exceeded. Based on an Occupational Safety and Health Administration (OSHA) safety standards, the thresholds for gases such as methane may be 1,000 Parts Per million (PPM), and Carbon monoxide (CO) may be 50 PPM.

In some embodiments, the transceiver module 321 may also receive temporal data from one or more data sources associated with the sewer monitoring system 204. In some embodiments, the temporal data may include, but not limited to, time specific data or time stamp data corresponding to the sewer monitoring system 204, and the like. In some embodiments, an AT+CCLK (AT refers to Attention) command may set the clock of the sewer monitoring system 204. Upon initiating the AT command, the processor 206 may synchronize the timestamp from the nearest data sources such as cellular tower. A string type value format may be "yy/MM/dd, hh:mm:ss±zz", where first two characters "yy" may indicate year, next two characters "MM" may indicate month, subsequent two characters "dd" may indicate day. Further, the next two characters "hh" may indicate hour, subsequent two characters "mm" may indicate minutes, and next two characters "ss" may indicate seconds and, the two characters "zz" may indicate time zone (indicates the difference, expressed in quarters of an hour, between the local time and Greenwich Mean Time (GMT); range −48 +48). For instance, May 6, 1994, 22:10:00 GMT+2 hours may be equal to "94/05/06, 22:10:00+08. In some embodiments, the transceiver module 321 may also receive meteorological data from one or more data sources associated with the sewer monitoring system 204. The meteorological data may include, but not limited to, atmosphere temperature, dew point, wind direction, wind speed, cloud cover, cloud layer(s), visibility, current weather, and the like.

In some embodiments, the measurement values from the level sensor in other words level of the wastewater in the sewer manhole 201 may be measured using a distance measurement technique, which includes a distance measurement equation. As an example, the level sensor used in the present disclosure to measure the level of the wastewater (also referred as range) accurately may be IWR1443 sensor. The IWR1443 sensor includes an entire Radiofrequency (RF) and analog baseband signal chain for up to three transmitters and four receivers, as well as a customer-programmable Processor and hardware accelerator for radar signal processing. The IWR1443 sensor converts RF front-end analog data to a digital representation through an analog-to-digital converter, which is then used to generate the range value.

In some embodiments, to perform the distance measurement, the level sensor may utilize a zoom Fast Fourier Transform (FFT) technique. In some embodiments, the zoom FFT technique may include a first step that involves taking a One-Dimensional (1D) coarse FFT to search for a peak spectrum of measurement values, and a second step that involves a second zoom-in FFT to analyze a portion of the peak spectrum of measurement values, at much higher resolution. Before each measurement, the processor 206 may enable the level sensor and transmit configuration commands to the level sensor to start the measurement. The level sensor may trigger a burst of chirps in the chamber of the sewer manhole 201, obtains measurement values and provides an output result to the sewer monitoring system 204. In some embodiments, the output result may include, but not limited to, the following details:

Header: Size: 36 bytes

Detected Objects: May be included when "detected objects" parameter is set to 1. It contains range information of detected objects such as benching, metal steps and the like (Size: 24 bytes)

Range Profile: May be included when "range profile" parameter is set to 1. It contains Log Magnitude Range FFTs (Size: 8+no of range bins*2 bytes)

Statistics: May be included when "statistics" parameter is set to 1. It contains performance data of the IWR1443 level sensor.

Padding Bytes: May be included to make total packet length in multiple of 32.

In some embodiments, upon receiving the output result from the level sensor, the processor 206 may measure the distance (i.e., range) using the output result using below Equation 1:

$$\text{Distance in meters} = \text{Range Index} * \text{Range resolution} \qquad \text{Equation 1}$$

In the above Equation 1, the distance index value may be decided based on the detected object(s) structure.

In some embodiments, the Range resolution may be determined using below Equation 2.

$$\text{Range Resolution} = \text{Speed of light} * \\ (\text{digOutSampleRate} * 1e3)/(2*(\text{freqSlopeConst} * \\ (1e6/1e-6))*\text{numRange Bins}) \qquad \text{Equation 2}$$

In the above Equation 2,

Speed of light: $3 \times 10^8$ meters/Sec digOutSampleRate: Analog to Digital Converter (ADC) sampling frequency in ksps. (4000)

freqSlopeConst: Frequency slope for the chirp in MHz/μs (100)

numRangeBins: 2^ceil(log 2("numAdcSamples")), which means that "numAdcSamples" rounded up to the next power of 2 to yield "numRangeBins". Consider numAdcSamples=128, therefore, numRangeBins would be 256.

In some embodiments, the processor 206 may calibrate the resultant distance in meters determined using Equation 2. Therefore, to determine the calibrate distance in meters, the processor 206 may subtract a value, for instance, 0.69 meters from the final range. In some embodiments, the value to be subtracted for calibration purpose may be pre-configured. In an instance, for each measurement a total of 250 milli-seconds (ms) is required, where 150 ms may be required for sensor configuration and 100 ms may be required for measuring and processing the output result receive from the level sensor.

In some embodiments, upon receiving the measured values from the level sensor, the error determining module 323 may determine an accuracy error in the measured values received from the level sensor, for one or more conditions. In some embodiments, the one or more conditions may include, but not limited to, the measured values of the level sensor exceeding actual depth of the sewer manhole 201 (referred below as condition 1), the measured values of the level sensor correspond to detection of a benching in the sewer manhole 201 instead of detection of a channel when the sewer manhole 201 is empty (referred below as condition 2), and the measured values of the level sensor correspond to detection of one or more objects protruding from inner walls of the sewer manhole 201 (referred below as condition 3).

Figure 3B:
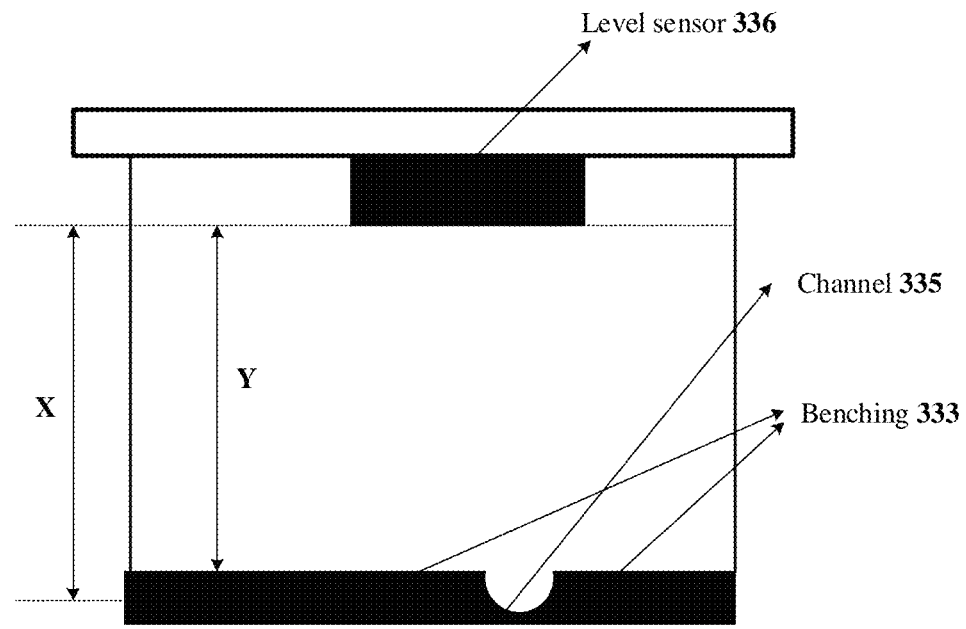
FIG. 3B shows an exemplary scenario illustrating an exemplary condition where range is detected based on benching of a manhole sewer in accordance with some embodiments of the present disclosure.

In some embodiments, material inside the sewer manhole 201 may be made of plastic which may act as a transparent medium to the high frequency Radio Frequency (RF) waves. However, in some types of plastic material, RF waves may not get proper reflection, due to the occurrence of refraction. Therefore, traveling time of the RF waves increases, which in turn increases the range measurement i.e., measurement indicating level of wastewater, as the range measurement is directly proportional to the traveling time of RF waves. In such scenarios, the condition 1 may occur, wherein the measured values of the level sensor exceed actual depth of the sewer manhole 201. Further, in some embodiments, channels inside the sewer manhole 201 may have a small radius. Due to this, instead of measuring the range from the channel when the sewer manhole 201 is empty, the range may be measured from the benching surface. As shown in the FIG. 3B, range "Y" from an exemplary benching 333 may be measured instead of range "X" from an exemplary channel 335. This may result in condition 2 where the measured values of the level sensor 336 correspond to detection of a benching in the sewer manhole 201 instead of detection of the channel when the sewer manhole 201 is empty. Further, in some embodiments, the sewer manhole 201 may have metal steps such as Iron steps on sides of the walls of the sewer manhole 201, which enable the concerned personnel to get into the sewer manhole 201. These metal steps may act as obstacles between the level sensor 336 and the wastewater in the sewer manhole 201. Therefore, instead of measuring the level of the wastewater in the sewer manhole 201, the level sensor 336 may measure the range with respect to detection of the obstacles such as metal steps. As shown in the FIG. 3C, instead of measuring the range "X" which is the level of the wastewater, the level sensor 336 may measure range "Y" or range "Z" corresponding to exemplary iron steps 337a and 337b protruding from walls of the sewer manhole 201. This leads to the condition 3, where the measured values of the level sensor 336 correspond to detection of one or more objects protruding from inner walls of the sewer manhole 201.

In some embodiments, when the error determining module 323 determines an accuracy error corresponding to the condition 1, the error resolving module 325 may dynamically set a first range limit for the measured values of the level sensor 336 based on an actual depth of the sewer manhole 201. Based on the dynamically set first range limit, the level of wastewater in the sewer manhole 201 may be measured. Therefore, any measurements of the level sensor 336 that exceed the dynamically set first range limit may be eliminated as an incorrect measurement. In some embodiments, the error resolving module 325 may dynamically set the first range limit for the measured values of the level sensor 336 each time when the level sensor 336 is enabled for measuring the level of wastewater in the sewer manhole 201. Therefore, by eliminating the incorrect measurement values based on the dynamically set first range limit, the error resolving module 325 may resolve the accuracy error in the measured values of the level sensor 336, which occurred due to condition 1.

As an example, when the level measurement needs to be triggered, the error resolving module 325 may send RF configuration commands to level sensor 336 such as IWR1443, based on which the level sensor 336 may perform the measurement of the level of the wastewater in the sewer manhole 201. As an example, one of the RF configuration command may be RangeLimitCfg command. In some embodiments, the RangeLimitCfg command may allow the error resolving module 325 to limit the measurement range of the level sensor 336. As an example, the RangeLimitCfg command may be set as "RangeLimitCfg 1 0.2 3". In this command, number in the first position may indicate disable or enable status. In some embodiments, the disable status may be indicated by "0" and the enable status may be indicated by "1". Further, in the above command, numbers in the second position and the third position may indicate a first range limit. For instance, the number in the second position may indicate minimum value of the first range limit and the number in the third position may indicate maximum value of the first range limit. In the above exemplary command, the minimum value is set as 0.2 meters and the maximum value is set as 3 meters. In some embodiments, the maximum value may be manually measured for each sewer manhole 201 and updated in the memory 210 or any other storage device associated with the sewer monitoring system 204. In some embodiments, the maximum value may also be stored in a remote server 214 associated with the sewer monitoring system 204. Each time a measurement through the level sensor 336 is triggered, the error resolving module 325 may retrieve the actual depth of the sewer manhole 201 from the respective storage space, based on which the error resolving module 325 dynamically sets the first range limit and shares a configuration command corresponding to the first range limit to the level sensor 336. Therefore, in this manner, when the exemplary configuration command "RangeLimitCfg 1 0.2 3" is provided to the level sensor 336, it means that, the error resolving module 325 is triggering the level sensor 336 to measure the level of the wastewater in the sewer manhole 201 by setting the enable status using the number in the first position as "1", within the minimum value of the first range limit of "0.2 meters" and the maximum value of the first range limit of "3 meters". Through this command, the error resolving module 325 may command the level sensor 336 to reject any measured values which go beyond the dynamically set minimum value and the maximum value of the first range limit.

In some embodiments, when the error determining module 323 determines an accuracy error corresponding to the condition 2 or condition 3, the error resolving module 325 may dynamically set a unique second range limit for the measured values of the level sensor 336. In some embodiments, the unique second range limit may be dynamically set by the error resolving module 325 using the actual depth of the sewer manhole 201 as maximum value of the unique second range limit and a measured value of the level sensor 336 of a previous iteration as a current minimum value of the unique second range limit, for each iteration. As an example, consider condition 3, which means that the sewer manhole 201 comprises exemplary iron steps 337a and 337b protruding from the walls of the sewer manhole 201 as shown in the FIG. 3C, and the measured distance (range/level) is due to the detection of the exemplary iron steps 337a and 337b that come between the level sensor 336 and the level of the wastewater in the sewer manhole 201. As per FIG. 3C, the measured value "Y" of the level sensor 336 in the previous iteration with respect to detection of the exemplary iron step 337a is "0.3 meters", and the actual depth of the sewer manhole 201 is "2 meters". Therefore, current minimum value of the unique second range limit would be set as "0.3 meters" and maximum value of the unique second range limit would be set as "2 meters". Therefore, at this stage, the exemplary configuration command may be set as "RangeLimitCfg 1 0.3 2" and provided to the level sensor 336. It means that, the error resolving module 325 is triggering the level sensor 336 to measure the level of the wastewater in the sewer manhole 201 by setting the enable status using the number in the first position as "1", within the minimum value of the unique second range limit of "0.3 meters" and the maximum value of the unique second range limit of "2 meters". Through this command, the error resolving module 325 may command the level sensor 336 to reject any measured values which go beyond the dynamically set minimum value of "0.3 meters" and the maximum value of "2 meters". Consider the measured value of the level sensor 336 obtained based on the aforementioned exemplary configuration command is "Z" meters i.e., "0.6 meters".

Figure 3C:
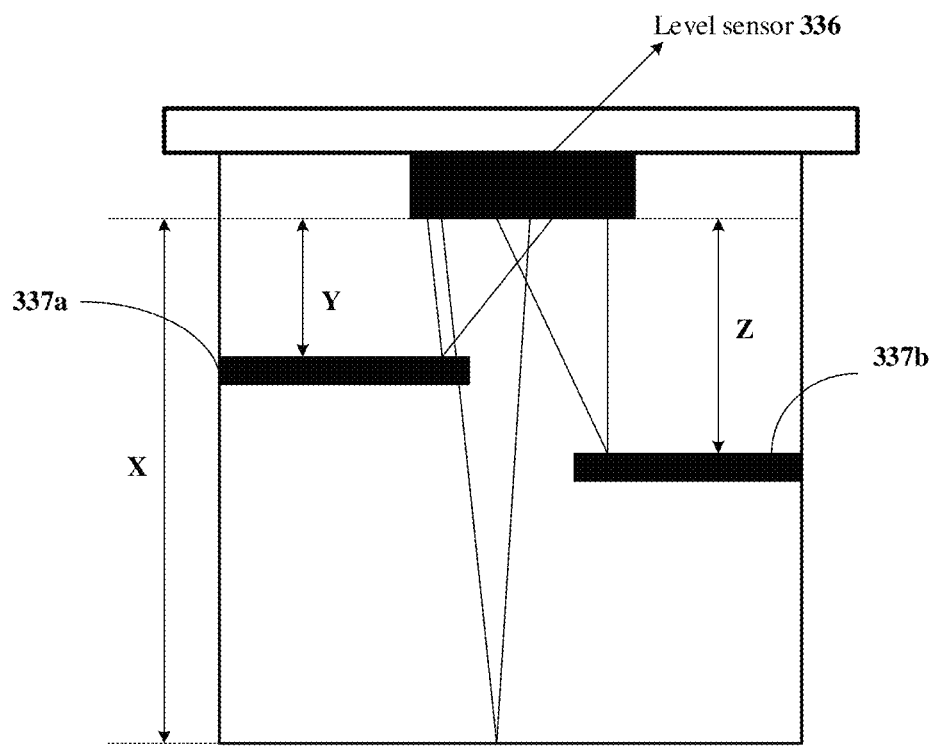
FIG. 3C shows an exemplary scenario illustrating an exemplary condition where range is detected based on metal steps of the manhole sewer in accordance with some embodiments of the present disclosure.

For the next iteration, as shown in the FIG. 3C, the measured value "Z" of the level sensor 336 in the previous iteration with respect to detection of metal step "0.6 meters" is considered as the current minimum value of the unique second range limit, and the actual depth of the sewer manhole 201 "2 meters" is retained as the maximum value of the unique second range limit. Therefore, at this stage, the exemplary configuration command may be set as "RangeLimitCfg 1 0.6 2" and provided to the level sensor 336. It means that, the error resolving module 325 is triggering the level sensor 336 to measure the level of the wastewater in the sewer manhole 201 by setting the enable status using the number in the first position as "1", within the minimum value of the unique second range limit of "0.6 meters" and the maximum value of the unique second range limit of "2 meters". Through this command, the error resolving module 325 may command the level sensor 336 to reject any measured values which go beyond the dynamically set minimum value of "0.6 meters" and the maximum value of "2 meters". The error resolving module 325 may continue this process of dynamically setting the unique second range limit using the actual depth of the sewer manhole 201 as maximum value of the unique second range limit and the measured value of the level sensor 336 of the previous iteration as the current minimum value of the unique second range limit, until the measured value of the level sensor 336 of a current iteration fails to exceed the current minimum value. For instance, consider in the iteration 5, the measured value of the level sensor 336 is "1 meter". Thereafter, for iteration 6, "1 meter" may be set as the current minimum value of the unique second range limit and the level sensor 336 yet again measures the level of the wastewater in the sewer manhole 201. Consider in the iteration 6, the measured value of the level sensor 336 is again "1 meter", and the same value is recorded for iteration 7 as well. This means that, the level sensor 336 is measuring the level of the wastewater and not the level with respect to obstacles that occur between the level sensor 336 and the level of the wastewater in the sewer manhole 201, since the measure value of the level sensor 336 is constant and not changing further. Therefore, in this manner, by dynamically setting the unique second range limit and sharing the configuration command to the level sensor 336, the error resolving module 325 may control the level sensor 336 to reject any measured values which go beyond the dynamically set minimum value and the maximum value of the unique second range limit.

In some embodiments, similar process is applied when the error determining module 323 determines an accuracy error corresponding to the condition 2. As explained above, the measured value of the level sensor 336 obtained due to the detection of benching may be set as the current minimum value of the unique second range limit and the actual depth of the sewer manhole 201 may be set as the maximum value of the unique second range limit. The error resolving module 325 would continue this process of dynamically setting the unique second range limit using the actual depth of the sewer manhole 201 as maximum value of the unique second range limit and the measured value of the level sensor 336 of the previous iteration as the current minimum value of the unique second range limit, until the measured value of the level sensor 336 of a current iteration fails to exceed the current minimum value. In some embodiments, the resultant values obtained upon resolving the accuracy errors in the measured values of the level sensor 336 may be referred as the accurate measured values.

In some embodiments, upon resolving the accuracy errors in the measured values of the level sensor 336, the risk determining module 327 may determine a risk associated with the sewer manhole 201 based on the accurate measured values of the level sensor 336, for monitoring the sewer manhole 201 from a remote location. In some embodiments, initially, the risk determining module 327 may categorize each of the accurate measured values of the level sensor 336 and recorded values received from the one or more additional sensors into a risk category based on pre-set risk thresholds for the corresponding sewer manhole 201. As an example, the risk categories may include, but not limited to, high risk, medium risk and low risk. In some embodiments, the risk categories may enable the risk determining module 327 to prioritize particular parts of the analysis which may be involved with high risk or medium risk. In some embodiments, in scenarios where the accurate measured values may have to be shared to an external device such as a remote server 214, then the risk categories may also enable the sewer monitoring system 204 to decide when the accurate measured values can be shared with the external device. For instance, when the risk category is one of "high risk" and "medium risk", the accurate measured values of the level sensor 336 and the measured values received from the one or more additional sensors may be transmitted immediately to the external device. However, when the risk category is "low risk", the accurate measured values of the level sensor 336 and the measured values received from the one or more additional sensors may be transmitted at predefined time intervals to the external device.

Figures 3D, 3E:
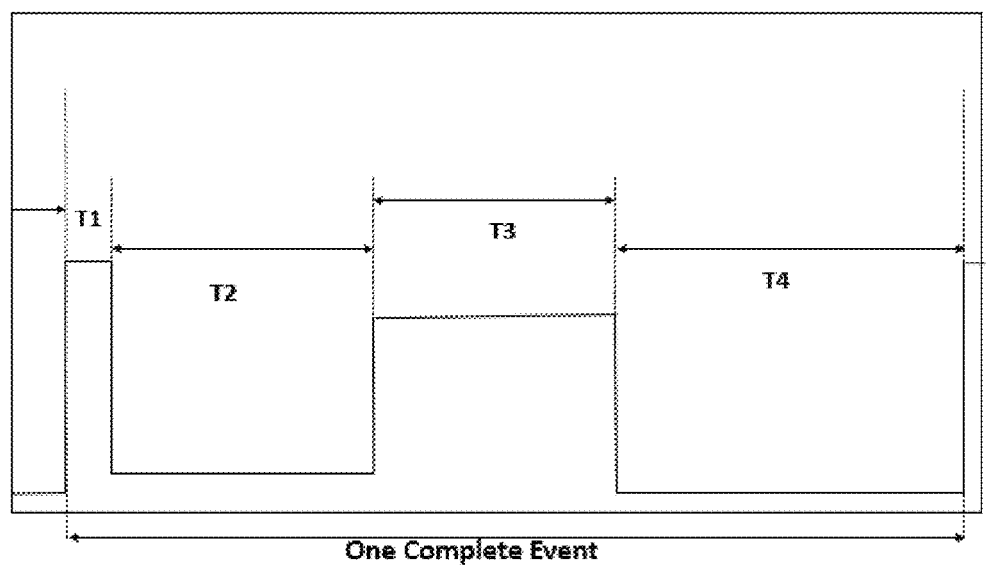
FIG. 3D shows an exemplary minimum and maximum limits of level of the wastewater associated with risk categories, in accordance with some embodiments of the present disclosure.
FIG. 3E illustrates an exemplary timing diagram for energy consumption in battery, in accordance with some embodiments of the present disclosure.

In some embodiments, consider exemplary minimum and maximum limits of level of the wastewater associated high risk, low risk and medium risk category, as shown in table of FIG. 3D.

In some embodiments, if the accurate measured value indicates that the level of the wastewater in the sewer manhole 201 is between H1: 0 cm and H2: 50 cm, then the accurate measured value may be categorized as "High risk". In some embodiments, if the accurate measured value indicates that the level of the wastewater in the sewer manhole 201 is between M1: 51 cm and M2: 100 cm, then the accurate measured value may be categorized as "Medium risk". In some embodiments, if the accurate measured value indicates that the level of the wastewater in the sewer manhole 201 is between L1: 101 cm and L2: 300 cm, then the accurate measured value may be categorized as "Low risk".

In some embodiments, the risk determining module 327 may thereafter segregate the accurate measured values of the level sensor 336, and the recorded values from the one or more additional sensors into one of seasonal category and trend category. The segregation may allow the risk determining module 327 to perform analysis based on at least one of season and weather at geolocation of the sewer manhole 201 and previously observed trend of the sewer manhole 201.

Further, in some embodiments, the risk determining module 327 may determine the risk associated with the sewer manhole 201. In some embodiments, to determine the risk associated with the sewer manhole 201, the risk determining module 327 may analyse the accurate measured values of the level sensor 336, and recorded values from the one or more additional sensors, in correlation with risk categories assigned to the accurate measured values of the level sensor 336 and the recorded values from the one or more additional sensors, historical data related to the sewer manhole 201 and specific predefined rules and thresholds corresponding to incidents and potential incidents related to the sewer manhole 201. Based on the analysis, the risk determining module 327 may either determine occurrence of an incident at the sewer manhole 201 or may predict occurrence of a potential incident at the sewer manhole 201. In some embodiments, the risk determining module 327 may perform both determination of occurrence of an incident at the sewer manhole 201 or prediction of occurrence of a potential incident at the sewer manhole 201.

In some embodiments, to determine the occurrence of an incident at the sewer manhole 201, the processor 206 may perform analysis in correlation with risk categories assigned to the accurate measured values of the level sensor 336 and the recorded values from the one or more additional sensors, specific predefined rules and thresholds corresponding to incidents related to the sewer manhole 201. In some embodiments, to predict the occurrence of a potential incident at the sewer manhole 201, the processor 206 may perform analysis in correlation with risk categories assigned to the accurate measured values of the level sensor 336 and the recorded values from the one or more additional sensors, specific predefined rules and thresholds corresponding to potential incidents related to the sewer manhole 201, and historical data 315 related to the sewer manhole 201. The historical data 315 may include data such as measured values from the one or more sensors 202, the error data 309, the resolved data 311 and the risk data 313 associated with the previous iterations/cycles. The historical data 315 may help in performing prediction of the occurrence of the potential incidents and in determining the occurrence of the incidents at the sewer manhole 201 by enabling the risk determining module 327 to understand trend and pattern associated with a particular sewer manhole 201. In some embodiments, the risk determining module 327 may also utilize data such as weather forecast data received from one or more data sources associated with the sewer monitoring system 204, along with the accurate measured values of the level sensor 336 and the recorded values from the one or more additional sensors to predict the occurrence of a potential incident at the sewer manhole 201 or to determine occurrence of an incident at the sewer manhole 201.

In some embodiments, to get access to the weather forecast data, the sewer monitoring system 204 may make a weather API request via a Universal Resource Locator (URL) to multiple data sources associated with weather forecast and historical information.

In some embodiments, the incidents and the potential incidents may include, but not limited to, blockages or flooding in the sewer manhole 201 due to increasing/decreasing a level of wastewater in the sewer manhole 201, unauthorized tampering of sewer manhole 201, presence of flammable gas in the sewer manhole 201, battery level and battery performance of the one or more additional sensors and the level sensor 336 and catching of fire in the sewer manhole 201. In some embodiments, the risk determining module 327 may determine tampering of the sewer manhole 201 by detecting the amount of light entering the sewer manhole 201 using the light sensor. In an implementation, when the light sensor detects a sudden increase in amount of light entering the sewer manhole 201 and the levels sensor detects that the level of the wastewater in the sewer manhole 201 has increased simultaneously, then the risk determining module 327 may infer that lid of the sewer manhole 201 has been opened and an unauthorized person has made an attempt to enter into the sewer manhole 201. This is on the basis that, when the lid of the sewer manhole 201 is opened, the amount of light entering the sewer manhole 201 increases substantially compared to the amount of light present in the sewer manhole 201. Also, when an unauthorized person enters the sewer manhole 201, the level of water may vary. Therefore, when the light sensor and the level sensor 336 both provide measured values corresponding to high-risk data simultaneously or near simultaneously, then it may be detected as unauthorized tampering of the sewer manhole 201. In another embodiment, receiving measured values corresponding to high-risk data only from the light sensor also may be inferred as unauthorized tampering of the sewer manhole 201. As an example, when the difference in the amount of light entering the sewer manhole 201 is greater than 300 lux, then it may be inferred as unauthorized tampering of the sewer manhole 201.

In some embodiments, the risk determining module 327 may determine presence of flammable gas in the sewer manhole 201 using the gas sensor. In an implementation, when the recorded values received from the gas sensor showcase an increase in concentration of predefined gases in the sewer manhole 201 above a predefined threshold, then the risk determining module 327 may infer as the presence of flammable gases. As an example, the predefined gases may include, but not limited to, Methane and Carbon Monoxide (CO). As per the standards set by Occupational Safety and Health Administration (OSHA) safety standards, threshold for Methane may be 1000 PPM and threshold for CO may be 50 PPM. Therefore, as an example, when measured value of Methane gas is determined to be greater than 1000 PPM, it may be inferred as presence of flammable gas.

In some embodiments, the risk determining module 327 may further generate at least one of incident alerts and potential incident alerts related to the sewer manhole 201 to enable utility personnel to take one or more actions to mitigate or prevent damage to the sewer manhole 201 due to the occurrence of the incident or the predicted occurrence of the potential incident at the sewer manhole 201. In some embodiments, when the risk determining module 327 determines occurrence of an incident at the sewer manhole 201, then the incident alert may be generated. In some other embodiments, when the risk determining module 327 predicts occurrence of a potential incident at the sewer manhole 201, then the potential incident alert may be generated. As an example, consider the level of wastewater in the sewer manhole 201 has increased above a threshold corresponding to High Risk. Then, the risk determining module 327 may generate an alert notifying flooding and/or heavy blockage at the sewer manhole 201. In some embodiments, the risk determining module 327 may provide geolocation of the sewer manhole 201 along with the alert to identify the sewer manhole 201 at which the incident has occurred. In some embodiments, the risk determining module 327 may predict that the battery performance of the one or more sensors 202 based on seasons. For instance, during the rainy season, active time of the one or more sensors 202 such as level sensor 336, light sensor etc., may be high. Due to this, battery replacement may be required at different sewer manhole 201*s*. Such prediction may be performed by the risk determining module 327 and an alert may be generated to indicate the potential incident of exhaustion of battery of the one or more sensors 202.

The description of FIG. 3A is explained in view of exemplary architecture 200*a* as shown in the FIG. 2A. Explained below is the implementation when the exemplary architecture 200*b* is followed as shown in the FIG. 2B.

In some embodiments, the functionalities of the sewer monitoring system 204 may be same in architecture 200*b* as that in architecture 200*a* as explained in the present disclosure as part of the description of FIG. 3A, until the point of resolving accuracy error in the measured values received from the level sensor 336. Upon resolving the accuracy error, according to the exemplary architecture 200*b*, the sewer monitoring system 204 may transmit the accurate measured values of the level sensor 336 to a remote server 214 associated with the sewer monitoring system 204, for monitoring the sewer manhole 201 from a remote location. In some embodiments, the sewer monitoring system 204 may transmit the accurate measured values of the level sensor 336 and the recorded values received from the one or more additional sensors to the remote server 214 using a NarrowBand-Internet of Things (NB-IoT) mode and a User Datagram Protocol (UDP), at predefined time intervals. The UDP may include UDP packets with a payload.

In some embodiments, Consumed Energy (CE) data indicating the amount of energy used for each measurement of wastewater level may be transmitted as part of recorded values received from the one or more additional sensors to the remote server 214, in every packet of UDP. In some embodiments, the battery level detection sensor may include a battery management circuit, which may measure current battery consumption and may compute remaining battery life. The total consumption of the battery for each cycle or iteration of wastewater level measurement in the sewer manhole 201 may be as shown in an exemplary timing diagram depicted in the FIG. 3E. In FIG. 3E, the time duration 'T1' in seconds, is a duration of wastewater level measurement using the level sensor 336, the time duration 'T2' in seconds, is a duration of NB-IoT/LTE-M initialization, the time duration 'T3' in seconds is a duration of NB-IoT/LTE-M communication, and the time duration 'T4' in seconds, is a duration of sleep mode. The 'T4' is equal to 'total measure_interval'—(T1+T2+T3). Further, the battery management circuit may calculate an estimated battery life as shown in the exemplary table of FIG. 3F. In some embodiments, the battery management circuit of the battery level detection sensor may compute a real time available battery life percentage, using below Equation 3:

Consumed Energy(CE) for the measurement/events in Joules(J)=$((T1*0.37)+(T2*0.047)+(T3*0.23)+(T4*0.0001))*3.6$      Equation 3

In the above Equation 3, 'T1' may refer to a time duration in seconds, which is a duration of wastewater level measurement using level sensor 336, 'T2' may refer to a time duration in seconds, which is a duration of NB-IoT/LTE-M initialization. Similarly, 'T3' may refer to a time duration in seconds, which is a duration of NB-IoT/LTE-M communication, and the 'T4' may refer to a time duration in seconds which is a duration of sleep mode. In the above Equation 3, 0.37 may refer to current measured in Amps at time "T1", 0.047 may refer to current measured in Amps at time "T2", 0.23 may refer to current measured in Amps at time "T3" and 0.0001 may refer to current measured in Amps at time "T4". The values 0.37 Amps, 0.047 Amps, 0.23 Amps and 0.0001 Amps are all exemplary and illustrative, and may vary. Hence, these values should not be construed as a limitation of the present disclosure.

In the remote server 214, the received CE data may be deducted from Total Energy (TE) of battery and may calculate the remaining percentage of battery. The remaining percentage of battery may be displayed on a web application associated with the remote server 214. For instance, battery voltage may be 3.60V, battery Ah rating may be 38.00 Amp hour (Ah), battery Ah which can be used may be 34.20 Ah, and energy available in the battery is 443232.00 Joules (J). The equation to calculate the available battery percentage of the sewer monitoring system 204 is as shown in below Equation 4:

Available battery(%)=(present available energy−received consumed energy)*100/443232      Equation 4

In the above Equation 4, initially, currently available energy in the battery may be 443232 (J). Upon receiving the CE from the sewer monitoring system 204, the available battery percentage may be decreased. In some embodiments, in the exemplary architecture 200a, the sewer monitoring system 204 may use same equations and determine the available battery (%) of the sewer monitoring system 204 without the need of a remote server 214. In such scenarios, energy and time consumed for NB-IoT/LTE-M initialization and communication, which occurs only in exemplary architecture 200b, may be eliminated.

In some embodiments, the sewer monitoring system 204 may transmit the accurate measured values of the level sensor 336 and the recorded values received from the one or more additional sensors to the remote server 214 based on the risk category associated with the accurate measured values and the recorded values of the one or more additional sensors. In some embodiments, when the risk category is one of "high risk" and "medium risk", the sewer monitoring system 204 may transmit the accurate measured values of the level sensor 336 and the measured values received from the one or more additional sensors immediately to the remote server 214. In some other embodiments, when the risk category is "low risk", the sewer monitoring system 204 may transmit the accurate measured values of the level sensor 336 and the measured values received from the one or more additional sensors at predefined time intervals to the remote server 214. In some embodiments, the sewer monitoring system 204 may transmit the accurate measured values of the level sensor 336 and the measured values received from the one or more additional sensors to the remote server 214 NB-IoT mode and the UDP, at predefined time intervals. The UDP may include UDP packets with a payload.

In some embodiments, prior to transmitting the UDP packets using the NB-IoT mode, the processor 206 may activate the transceiver module 321 and the processor 302 may check whether the transceiver module 321 is responding or not responding by sending an Attention (AT) command. Further, the transceiver module 321 may be set to NB-IoT mode and registered with network (wait time of 3 mins for example) of the NB-IoT antenna 212n. For the first time, the NB-IoT network registration may consume, for instance, more than 5-10 minutes. Further, if NB-IoT network is not available, then the NB-IoT registration may fail. If the NB-IoT network registration fails, then the transceiver module 321 may be set to Long Term Evolution for Machines (LTE-M) mode and may wait for the registration with LTE-M network. When the LTE-M mode also fails to register, then the sewer monitoring system 204 may store the accurate measured values of the level sensor 336 and the recorded values of the one or more additional sensors in the memory 210 and enter into a sleep mode by turning off the transceiver module 321. Upon successful network registration, signal strength may be fetched to assess the signal quality at respective location of the sewer monitoring system 204. Thereafter, the transceiver module 321 may connect to the network of the NB-IoT antenna 212n by providing an Access Point Name (APN) of a network provider. Further, the transceiver module 321 may activate the network and create a UDP connection with the remote server 214, by providing a server address and a port number of the remote server 214. The UDP may use a simple wireless communication, which is faster and more efficient than a Transmission Control Protocol (TCP). The UDP may provide checksums data integrity, and port numbers addressing different functions at the source and destination of the datagram. The UDP header format may include, but not limited to, length of source port and destination port in bits, length of the UDP including header and the data, header-and-data checksum, and the like. The UDP may have less header weight than TCP which increases the battery life of the sewer monitoring system 204. In some embodiments, transmission payload format may include, but not limited to, a total payload size of, for instance, 31 bytes, the identifier (ID) of the sewer monitoring system 204, for instance, 8 bytes, event time stamp (e.g., 6 bytes), distance from wastewater surface (e.g., 2 bytes), temperature (e.g., 1 byte), signal strength (e.g., 1 byte), latitude and longitude (e.g., 6 bytes), light detection value (e.g., 1 byte), hydrocarbon and methane gas data (e.g., 2 bytes), data interval (e.g., 2 bytes), and battery consumption (e.g., 2 bytes). The payload format of the UDP header may be of, for instance, 8-bytes, in which the length of the source port number and the destination port number is of 2 bytes long field, length of the UDP including header and the data is 2 bytes long field, and the checksum is 2 bytes long field. In some embodiments, the accurate measured values of the level sensor 336 and the recorded values of the one or more additional sensors plurality of parameters may be set into the predefined JavaScript Object Notation (JSON) format and may be transmitted to the remote server 214. The processor 206 may wait for the response from the transceiver module 321 as for instance, "SEND OK". In response, the transceiver module 321 may receive a data interval, alert settings, and other parameters from the remote server 214, which may be stored in the memory 210 of the sewer monitoring system 204. Thereafter, the transceiver module 321 may be deactivated (turned off). In some embodiments, the transceiver module 321 may transmit the UDP to the remote server 214 via the respective NB-IoT antenna 212. The NB-IoT antenna 212 may be responsible for aggregating data from multiple sewer monitoring systems 204 and relaying the aggregated data to the remote server 214, using a low-power wide-area network in one or more packets. The sewer monitoring system and the NB-IoT antenna 212 may be configured to communicate over a low-power wide-area network using a Radio Frequency (RF) of NB-IoT. The RF may be a Frequency-Modulated Continuous Wave (FMCW). When the NB-IoT network coverage is not available, the transceiver module 321 may automatically fall back to Long Term Evolution for Machines (LTE-M).

In some embodiments, the transceiver module 321 may receive a delayed Acknowledgement (ACK) from the remote server 214, when a measurement data i.e., accurate measured values of the level sensor 336 and the recorded values of the one or more additional sensors have been missed out or have reached the remote server 214 partially, until the missed-out data is received from the transceiver module 321. This enables the communication between the sewer monitoring system 204 and the remote server 214, to be more reliable.

In some embodiments, the remote server 214 may receive the accurately measured values from the level sensor 336, and measured values from the one or more additional sensors. The accurately measured values from the level sensor 336, and the measured values from the one or more additional sensors may be referred as input data in this context. Upon receiving the input data, the remote server 214 may perform one of determining occurrence of an incident at the sewer manhole 201 or predicting occurrence of a potential incident at the sewer manhole 201 based on analysis of the input data. In some embodiments, the analysis may be performed in correlation with risk categories of the input data, historical data related to the sewer manhole 201 and specific predefined rules and thresholds corresponding to incidents and potential incidents related to the sewer manhole 201. Based on the determination, the remote server 214 may generate incident alerts and potential incident alerts related to the sewer manhole 201 to enable utility personnel to take one or more actions to mitigate or prevent damage to the sewer manhole 201 due to the occurrence of the incident or the predicted occurrence of the potential incident at the sewer manhole 201. In some embodiments, the remote server 214 may be associated with the repository 216. In some embodiments, the repository 216 may include plurality of databases, which includes, for instance, reference data, historic data, forecast data, and previously measured data/values from the one or more sensors 202. Further, the repository 216 may include data, but not limited to, Identity (ID) numbers of each of the one or more sensors 202 and each sewer monitoring system 204 associated with the corresponding one or more sensors 202 and their respective coordinates. Therefore, to summarize, the part of the exemplary architecture 200a where the sewer monitoring system 204 performs risk determining, is performed by the remote server 214 in the exemplary architecture 200b upon receiving the input data from the sewer monitoring system 204.

Figure 4:
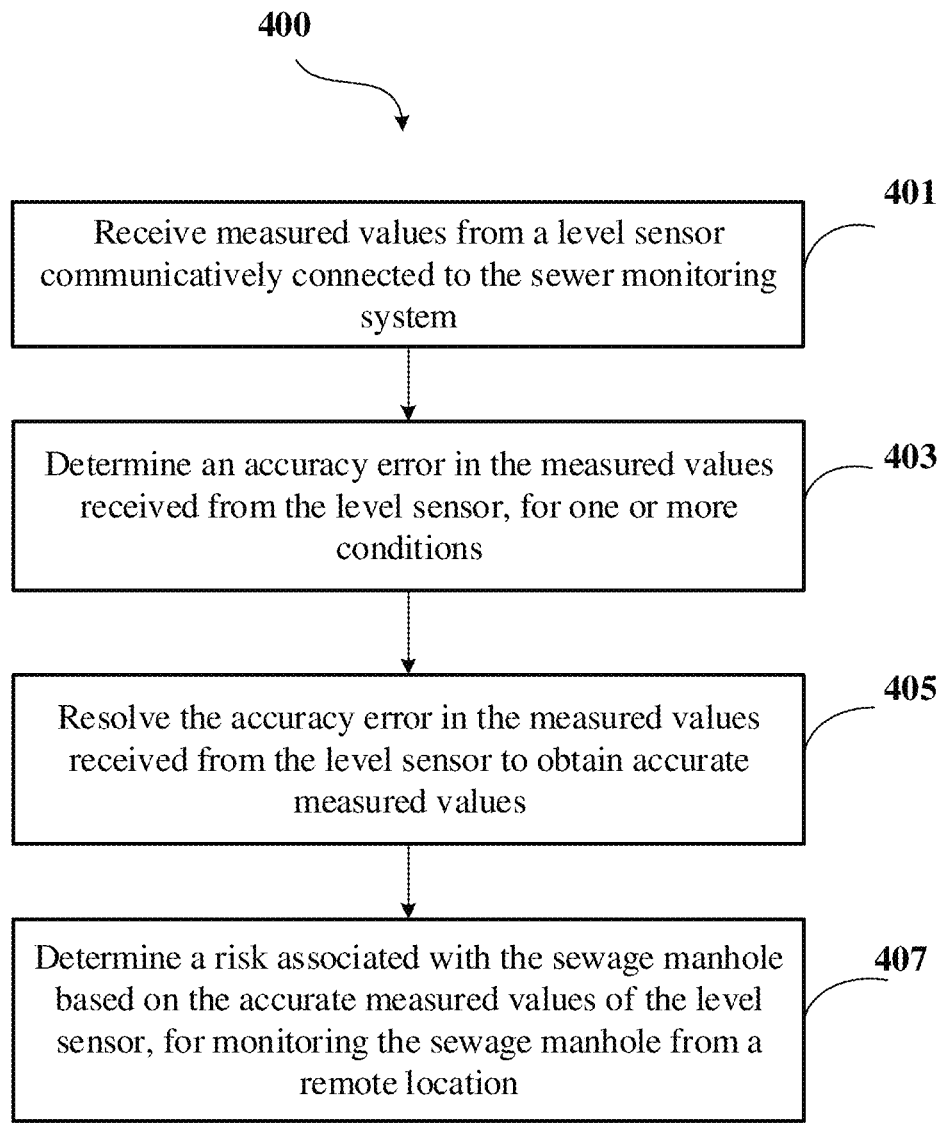
FIG. 4 shows a flowchart illustrating method of monitoring a sewer manhole from a remote location in accordance with some embodiments of the present disclosure.

FIG. 4 shows a flowchart illustrating method of monitoring a sewer manhole 201 from a remote location in accordance with some embodiments of the present disclosure.

As illustrated in FIG. 4, the method 400 comprises one or more blocks illustrating a monitoring a sewer manhole 201 from a remote location. The method 400 may be described in the general context of computer executable instructions. Generally, computer executable instructions can include routines, programs, objects, components, data structures, procedures, modules, and functions, which perform functions or implement abstract data types.

The order in which the method 400 is described is not intended to be construed as a limitation, and any number of the described method blocks can be combined in any order to implement the method 400. Additionally, individual blocks may be deleted from the methods without departing from the spirit and scope of the subject matter described herein. Furthermore, the method 400 can be implemented in any suitable hardware, software, firmware, or combination thereof.

At block 401, the method 400 may include receiving, by a processor 206 of a sewer monitoring system 204, measured values from a level sensor 336 communicatively connected to the sewer monitoring system 204. In some embodiments, the processor 206 may receive recorded values from one or more additional sensors communicatively connected to the sewer monitoring system 204. As an example, the one or more additional sensors may include, but not limited to, a temperature sensor, a light detection sensor, a Global Position System (GPS), a battery level detection sensor, and a gas sensor.

At block 404, the method 400 may include determining, by the processor 206, an accuracy error in the measured values received from the level sensor, for one or more conditions. In some embodiments, the one or more conditions may include, but not limited to, the measured values of the level sensor 336 exceeding actual depth of the sewer manhole 201, the measured values of the level sensor 336 correspond to detection of a benching in the sewer manhole 201 instead of detection of a channel, when the sewer manhole 201 is empty, and the measured values of the level sensor 336 correspond to detection of one or more objects protruding from inner walls of the sewer manhole 201.

At block 405, the method 400 may include resolving, by the processor 206, the accuracy error in the measured values received from the level sensor 336 to obtain accurate measured values. In some embodiments, to resolve the accuracy error in the measured values, the processor 206 may measure a level of wastewater in the sewer manhole 201 by setting a first range limit for the measured values of the level sensor dynamically based on an actual depth of the sewer manhole 201, each time the level sensor is enabled for measuring the level of wastewater in the sewer manhole 201. In some other embodiments, to resolve the accuracy error in the measured values, the processor 206 may iteratively measure the level of the wastewater in the sewer manhole 201 by setting a unique second range limit for the measured values of the level sensor dynamically, using the actual depth of the sewer manhole 201 as maximum value of the unique second range limit and a measured value of the level sensor of a previous iteration as a current minimum value of the unique second range limit, for each iteration, until the measured value of the level sensor of a current iteration fails to exceed the current minimum value.

At block 407, the method 400 may include determining, by the processor 206, a risk associated with the sewer manhole 201 based on the accurate measured values of the level sensor, for monitoring the sewer manhole 201 from a remote location. In some embodiments, to determine the risk associated with the sewer manhole 201 for monitoring the sewer manhole 201 from the remote location, the processor 206 may analyse the accurate measured values of the level sensor, and recorded values from one or more additional sensors communicatively connected to the sewer monitoring system. Thereafter, the processor 206 may perform at least one of determining occurrence of an incident at the sewer manhole 201 and predicting occurrence of a potential incident at the sewer manhole 201 based on the analysis in correlation with risk categories assigned to the accurate measured values of the level sensor and the recorded values from the one or more additional sensors, historical data related to the sewer manhole 201 and specific predefined rules and thresholds corresponding to incidents and potential incidents related to the sewer manhole 201. Further, the processor 206 may generate at least one of incident alerts and potential incident alerts related to the sewer manhole 201 to enable utility personnel to take one or more actions to mitigate or prevent damage to the sewer manhole 201 due to the occurrence of the incident or the predicted occurrence of the potential incident at the sewer manhole 201. In some embodiments, the incidents and the potential incidents may include, but not limited to, blockages or flooding in the sewer manhole 201 due to increasing/decreasing a level of wastewater in the sewer manhole 201, unauthorized tampering of sewer manhole 201, presence of flammable gas in the sewer manhole 201, battery level, and battery performance of the one or more additional sensors and the level sensor.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for monitoring a sewer manhole from a remote location. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

| Referral numerals | |
|---|---|
| Reference Number | Description |
| 102 | Exemplary metal lid (prior art) |
| 104 | Exemplary metal steps (prior art) |
| 106 | Exemplary Channel (prior art) |
| 108 | Exemplary benching |
| 200a and 200b | Exemplary architectures |
| 201 | Sewer manhole |
| 202 | One or more sensors |
| 204 | Sewer monitoring system |
| 206 | Processor |
| 208 | I/O interface |
| 210 | Memory |
| 212 | NB-IoT antenna |
| 214 | Remote Server |
| 216 | Repository |
| 303 | Data |
| 305 | Modules |
| 307 | Sensor data |
| 309 | Error data |
| 311 | Resolved data |
| 313 | Risk data |
| 315 | Historical data |
| 317 | Other data |
| 321 | Transceiver module |
| 323 | Error determining module |
| 325 | Error resolving module |
| 327 | Risk determining module |
| 329 | Categorizing module |
| 331 | Other modules |
| 333 | Exemplary Benching |
| 335 | Exemplary Channel |
| 336 | Level Sensor |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User interface |
| 407 | Operating system |
| 408 | Web browser |
| 409 | Communication network |
| 411 | Input devices |
| 412 | Output devices |

What is claimed is:

1. A method of monitoring a sewer manhole from a remote location, the method comprising:
receiving, by a sewer monitoring system configured in the sewer manhole, measured values from a level sensor communicatively connected to the sewer monitoring system;
determining, by the sewer monitoring system, an accuracy error in the measured values received from the level sensor, caused due to one or more conditions, wherein the one or more conditions pertain to an occurrence of one or more obstacles between the level sensor and a level of wastewater in the sewer manhole during level measurement;

resolving, by the sewer monitoring system, the accuracy error in the measured values received from the level sensor to obtain accurate measured values by:

measuring a level of wastewater in the sewer manhole by setting a first range limit for the measured values of the level sensor dynamically based on an actual depth of the sewer manhole, each time the level sensor is enabled for measuring the level of wastewater in the sewer manhole; and iteratively measuring the level of the wastewater in the sewer manhole by setting a unique second range limit for the measured values of the level sensor dynamically, using the actual depth of the sewer manhole as maximum value of the unique second range limit and a measured value of the level sensor of a previous iteration as a current minimum value of the unique second range limit, for each iteration, until the measured value of the level sensor of a current iteration fails to exceed the current minimum value, wherein the measured values of the level sensor of the previous iteration correspond to detection of the one or more obstacles in the sewer manhole; and determining, by the sewer monitoring system, a risk associated with the sewer manhole based on the accurate measured values of the level sensor, for monitoring the sewer manhole from a remote location.

2. The method as claimed in claim 1 further comprises receiving, by the sewer monitoring system, recorded values from one or more additional sensors communicatively connected to the sewer monitoring system, wherein the one or more additional sensors comprises at least one of a temperature sensor, a light detection sensor, a Global Position System (GPS), a battery level detection sensor, and a gas sensor.

3. The method as claimed in claim 1, wherein determining the risk associated with the sewer manhole for monitoring the sewer manhole from the remote location comprises:

analysing the accurate measured values of the level sensor, and recorded values from one or more additional sensors communicatively connected to the sewer monitoring system;

performing at least one of, determining occurrence of an incident at the sewer manhole and predicting occurrence of a potential incident at the sewer manhole based on the analysis in correlation with risk categories assigned to the accurate measured values of the level sensor and the recorded values from the one or more additional sensors, historical data related to the sewer manhole and specific predefined rules and thresholds corresponding to incidents and potential incidents related to the sewer manhole; and generating at least one of incident alerts and potential incident alerts related to the sewer manhole to enable utility personnel to take one or more actions to mitigate or prevent damage to the sewer manhole due to the occurrence of the incident or the predicted occurrence of the potential incident at the sewer manhole.

4. The method as claimed in claim 3, wherein the incidents and the potential incidents are related to at least one of blockages or flooding in the sewer manhole due to increasing or decreasing a level of wastewater in the sewer manhole, unauthorized tampering of sewer manhole, presence of flammable gas in the sewer manhole, battery level and battery performance of the one or more additional sensors and the level sensor.

5. The method as claimed in claim 1, further comprises segregating, by the sewer monitoring system, the accurate measured values of the level sensor, and recorded values from one or more additional sensors communicatively connected to the sewer monitoring system into one of seasonal category and trend category, for performing analysis based on at least one of season and weather at geolocation of the sewer manhole and previously observed trend of the sewer manhole.

6. The method as claimed in claim 1, wherein the one or more conditions comprises:

the measured values of the level sensor exceeding actual depth of the sewer manhole, the measured values of the level sensor correspond to detection of a benching in the sewer manhole instead of detection of a channel, when the sewer manhole is empty, and the measured values of the level sensor correspond to detection of the one or more obstacles protruding from inner walls of the sewer manhole.

7. The method as claimed in claim 1, wherein level of the wastewater is measured using a zoom Fast Fourier Transform (FFT) range measuring technique.

8. The method as claimed in claim 1, further comprises retrieving the first range limit from one of a storage associated with the sewer monitoring system or a remote server associated with the sewer monitoring system for setting the actual depth of the sewer manhole, wherein the first range limit is retrieved each time when the level sensor is enabled for measuring the level of wastewater in the sewer manhole.

9. The method as claimed in claim 1, further comprises categorizing, by the sewer monitoring system, each of the accurate measured values of the level sensor and recorded values received from one or more additional sensors into a risk category, based on pre-set risk thresholds for the corresponding sewer manhole, wherein the risk categories are characterised into high risk, medium risk, and low risk.

10. A sewer monitoring system for monitoring a sewer manhole from a remote location, the sewage monitoring system comprising a processor and a memory communicatively coupled to the processor, wherein the memory stores the processor-executable instructions, which, on execution, causes the processor to:

receive measured values from a level sensor communicatively connected to the sewer monitoring system;

determine an accuracy error in the measured values received from the level sensor, caused due to one or more conditions, wherein the one or more conditions pertain to an occurrence of one or more obstacles between the level sensor and the level of wastewater in the sewer manhole during level measurement;

resolve the accuracy error in the measured values received from the level sensor to obtain accurate measured values by:

measuring a level of wastewater in the sewer manhole by setting a first range limit for the measured values, of the level sensor dynamically based on an actual depth of the sewer manhole, each time the level sensor is enabled for measuring the level of wastewater in the sewer manhole and iteratively measuring the level of the wastewater in the sewer manhole by setting a unique second range limit for the measured values of the level sensor dynamically, using the actual depth of the sewer manhole as maximum value of the unique second range limit and a measured value of the level sensor of a previous iteration as a current minimum value of the unique second range limit, for each iteration, until the measured value of the level sensor of a current iteration fans to exceed the current minimum value, wherein the measured values of the level sensor of the previous iteration correspond to detection of the one or more obstacles in the sewer manhole; and determine a risk associated with the sewer manhole based on the accurate measured values of the level sensor, for monitoring the sewer manhole from a remote location.

11. The sewer monitoring system as claimed in claim 10, wherein the processor is further configured to receive recorded values from one or more additional sensors communicatively connected to the sewer monitoring system, wherein the one or more additional sensors comprises at least one of a temperature sensor, a light detection sensor, a Global Position System (GPS), a battery level detection sensor, and a gas sensor.

12. The sewer monitor in system as claimed in claim 10, wherein to determine the risk associated with the sewer manhole for monitoring the sewer manhole from the remote location, the processor, is configured to:
analyse the accurate measured values of the level sensor, and recorded values from one or more additional sensors communicatively connected to the sewer monitoring system;
perform at least one of, determining occurrence of an incident at the sewer manhole and predicting occurrence of a potential incident at the sewer manhole based on the analysis in correlation with risk categories assigned to the accurate measured values of the level sensor and the recorded values from the one or more additional sensors, historical data related to the sewer manhole and specific predefined rules and thresholds corresponding to incidents and potential incidents related to the sewer manhole; and
generate at least one of incident alerts and potential incident alerts related to the sewer manhole to enable utility personnel to take one or more actions to mitigate or prevent damage to the sewer manhole due to the occurrence of the incident or the predicted occurrence of the potential incident at the sewer manhole.

13. The sewer monitoring system as claimed in claim 12, wherein the incidents and the potential incidents are related to at least one of blockages or flooding in the sewer manhole due to increasing or decreasing a level of wastewater in the sewer manhole, unauthorized tampering of sewer manhole, presence of flammable gas in the sewer manhole, battery level and battery performance of the one or more additional sensors and the level sensor.

14. The sewer monitoring system as claimed in claim 10, wherein the processor is configured to segregate the accurate measured values of the level sensor, and recorded values from one or more additional sensors communicatively connected to the sewer monitoring system into one of seasonal category and trend category, for performing analysis based on at least one of season and weather at geolocation of the sewer manhole and previously observed trend of the sewer manhole.

15. The sewer monitoring system as claimed in claim 10, wherein the one or more conditions comprises:
the measured values of the level sensor exceeding actual depth of the sewer manhole,
the measured values of the level sensor correspond to detection of a benching in the sewer manhole instead of detection of a channel, when the sewer manhole is empty, and
the measured values of the level sensor correspond to detection of one or more obstacles protruding from inner walls of the sewer manhole.

16. The sewer monitoring system as claimed in claim 10, wherein level of the wastewater is measured using a zoom Fast Fourier Transform (FFT) range measuring technique.

17. The sewer monitoring system as claimed in claim 10, wherein the processor is further configured to retrieve the first range limit from one of a storage associated with the sewer monitoring system or a remote server associated with the sewer monitoring system for setting the actual depth of the sewer manhole, wherein the first range limit is retrieved each time when the level sensor is enabled for measuring the level of wastewater in the sewer manhole.

18. The sewer monitoring system as claimed in claim 10, wherein the processor is further configured to categorize each of the accurate measured values of the level sensor and recorded values received from one or more additional sensors into a risk category, based on pre-set risk thresholds for the corresponding sewer manhole, wherein the risk categories are characterised into high risk, medium risk and low risk.

19. A non-transitory computer readable medium including instructions stored thereon that when processed by at least one processor causes a sewer monitoring system to perform operations comprising:
receiving measured values from a level sensor communicatively connected to the sewer monitoring system;
determining an accuracy error in the measured values received from the level sensor, one or more conditions, wherein the one or more conditions pertain to an occurrence of one or more obstacles between the level sensor and a level of wastewater in the sewer manhole during level measurement;
resolving the accuracy error in the measured values received from the level sensor to obtain accurate measured values by:
measuring a level of wastewater in the sewer manhole by setting a first range limit for the measured values of the level sensor dynamically based on an actual depth of the sewer manhole, each time the level sensor is enabled for measuring the level of wastewater in the sewer manhole and
iteratively measuring the level of the wastewater in the sewer manhole by setting a unique second range limit for the measured values of the level sensor dynamically, using the actual depth of the sewer manhole as maximum value of the unique second range limit and a measured value of the level sensor of a previous iteration as a current minimum value of the unique second range limit, for each iteration, until the measured value of the level sensor of a current iteration fails to exceed the current minimum value, wherein the measured values of the level sensor of the previous iteration correspond to detection of the one or more obstacles in the sewer manhole; and
determining a risk associated with the sewer manhole based on the accurate measured values of the level sensor, for monitoring the sewer manhole from a remote location.

* * * * *